United States Patent
Damnjanovic et al.

(10) Patent No.: US 11,558,902 B2
(45) Date of Patent: Jan. 17, 2023

(54) MANAGEMENT OF SPECTRUM SHARING FOR PRIORITIZED AND NON-PRIORITIZED USERS IN WIRELESS COMMUNICATION SYSTEM

(71) Applicant: QUALCOMM Incorporated, San Diego, CA (US)

(72) Inventors: Aleksandar Damnjanovic, Del Mar, CA (US); Arumugam Chendamarai Kannan, San Diego, CA (US); Xiaoxia Zhang, San Diego, CA (US); Tao Luo, San Diego, CA (US); Jing Sun, San Diego, CA (US); Rajat Prakash, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/392,084

(22) Filed: Aug. 2, 2021

(65) Prior Publication Data

US 2022/0046709 A1    Feb. 10, 2022

Related U.S. Application Data

(60) Provisional application No. 63/063,104, filed on Aug. 7, 2020.

(51) Int. Cl.
*H04W 74/08* (2009.01)
*H04W 16/14* (2009.01)

(52) U.S. Cl.
CPC ....... *H04W 74/0816* (2013.01); *H04W 16/14* (2013.01)

(58) Field of Classification Search
CPC ... H04B 7/0456; H04B 7/0695; H04W 16/14; H04W 72/0473; H04W 74/0808; H04W 74/0816; H04W 74/0875
See application file for complete search history.

(56) References Cited

U.S. PATENT DOCUMENTS

| | | | |
|---|---|---|---|
| 2019/0182840 A1* | 6/2019 | Feng | H04W 74/0816 |
| 2019/0380148 A1* | 12/2019 | Dudda | H04W 74/02 |
| 2021/0195649 A1* | 6/2021 | Xue | H04W 76/14 |
| 2021/0307065 A1* | 9/2021 | Xue | H04W 16/14 |

* cited by examiner

*Primary Examiner* — Kashif Siddiqui
(74) *Attorney, Agent, or Firm* — Loza & Loza, LLP

(57) ABSTRACT

Aspects relate to spectrum sharing for use in a wireless communication network that serves both prioritized and non-prioritized user access terminals. In one example, a user access terminal, e.g., a user equipment (UE), senses an amount of signal energy within a frequency band during one or more sensing intervals in response to a determination that the access terminal is a non-prioritized access terminal. If the amount of signal energy does not exceed a sensed energy threshold, the user access terminal transmits wireless signals following the sensing intervals. On the other hand, if the amount of signal energy exceeds the sensed energy threshold, the user access terminal modifies transmissions while the amount of signal energy sensed during one or more subsequent sensing intervals exceeds the sensed energy threshold. For example, the access terminal may delay or adjust transmissions until the amount of signal energy no longer exceeds the sensed energy threshold.

30 Claims, 14 Drawing Sheets

MANAGEMENT OF SPECTRUM SHARING FOR PRIORITIZED AND NON-PRIORITIZED USERS IN WIRELESS COMMUNICATION SYSTEM

CROSS-REFERENCE TO RELATED APPLICATIONS

The present application for Patent claims priority to Provisional Application Ser. No. 63/063,104, titled "MANAGEMENT OF SPECTRUM SHARING FOR PRIORITIZED AND NON-PRIORITIZED USERS IN WIRELESS COMMUNICATION SYSTEM," filed Aug. 7, 2020, and assigned to the assignee hereof and hereby expressly incorporated by reference herein as if fully set forth below and for all applicable purposes.

FIELD OF THE DISCLOSURE

The technology discussed herein generally relates to wireless communication systems, and more particularly, to spectrum sharing with a wireless communication network that includes prioritized users and non-prioritized users.

DESCRIPTION OF RELATED ART

As the demand for higher data rates and improved reliability increases, wireless network operators continue to develop mechanisms for managing access to a shared wireless communication spectrum. Some wireless communication systems may be configured to distinguish between prioritized users and non-prioritized users, with prioritized users given preferential access to at least a portion of the shared wireless communication spectrum. There is an ongoing need to provide improved systems and techniques for managing access to a shared wireless communication spectrum within networks that distinguish between prioritized users and non-prioritized users.

SUMMARY

The following presents a summary of one or more aspects of the present disclosure, in order to provide a basic understanding of such aspects. This summary is not an extensive overview of all contemplated features of the disclosure, and is not intended to either identify key or critical elements of any or all aspects of the disclosure or delineate the scope of any or all aspects of the disclosure. Its purpose is to present some concepts of one or more aspects of the disclosure in a form as a prelude to the more detailed description that is presented later.

In one aspect of the disclosure, an access terminal is provided for use in a wireless communication network that serves prioritized user access terminals and non-prioritized user access terminals. The access terminal includes a transceiver; a memory; and a processor communicatively coupled to the transceiver and the memory. The processor is configured to: sense, in response to a determination that the access terminal is a non-prioritized user access terminal, an amount of signal energy within a frequency band of the wireless communication network during one or more sensing intervals using the transceiver; transmit wireless signals using the transceiver following the one or more sensing intervals, in response to a determination that the amount of signal energy does not exceed a sensed energy threshold during the one or more sensing intervals; and modify transmission of the wireless signals by the transceiver, in response to a determination that the amount of signal energy exceeds the sensed energy threshold, while an amount of additional signal energy sensed during one or more subsequent sensing intervals exceeds the sensed energy threshold.

In another aspect of the disclosure, a method is provided for wireless communication for use by an access terminal in a wireless communication network that serves prioritized user access terminals and non-prioritized user access terminals. The method includes: sensing, in response to a determination that the access terminal is a non-prioritized user access terminal, an amount of signal energy within a frequency band of the wireless communication network during one or more sensing intervals; transmitting wireless signals following the one or more sensing intervals, in response to a determination that the amount of signal energy does not exceed a sensed energy threshold during the one or more sensing intervals; and modifying transmission of the wireless signals, in response to a determination that the amount of signal energy exceeds the sensed energy threshold, while an amount of additional signal energy sensed during one or more subsequent sensing intervals exceeds the sensed energy threshold.

In another aspect of the disclosure, an apparatus is provided for use in an access terminal of a wireless communication network that serves prioritized user access terminals and non-prioritized user access terminals. The apparatus includes: means, operative in response to a determination that the access terminal is a non-prioritized user access terminal, for sensing an amount of signal energy within a frequency band of the wireless communication network during one or more sensing intervals; means for transmitting wireless signals following the one or more sensing intervals, in response to a determination that the amount of signal energy does not exceed a sensed energy threshold during the one or more sensing intervals; and means for modifying transmission of the wireless signals, in response to a determination that the amount of signal energy exceeds the sensed energy threshold, while an amount of additional signal energy sensed during one or more subsequent sensing intervals exceeds the sensed energy threshold.

In yet another aspect of the disclosure, a non-transitory computer-readable medium is provided that has one or more instructions which, when executed by a processing circuit of an access terminal in a wireless communication network that serves prioritized user access terminals and non-prioritized user access terminals, causes the processing circuit to: sense, in response to a determination that the access terminal is a non-prioritized user access terminal, an amount of signal energy within a frequency band of the wireless communication network during one or more sensing intervals; transmit wireless signals following the one or more sensing intervals, in response to a determination that the amount of signal energy does not exceed a sensed energy threshold during the one or more sensing intervals; and modify transmission of the wireless signals, in response to a determination that the amount of signal energy exceeds the sensed energy threshold, while an amount of additional signal energy sensed during one or more subsequent sensing intervals exceeds the sensed energy threshold.

These and other aspects of the disclosure will become more fully understood upon a review of the detailed description, which follows. Other aspects, features, and embodiments of the present disclosure will become apparent to those of ordinary skill in the art, upon reviewing the following description of specific, exemplary embodiments in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
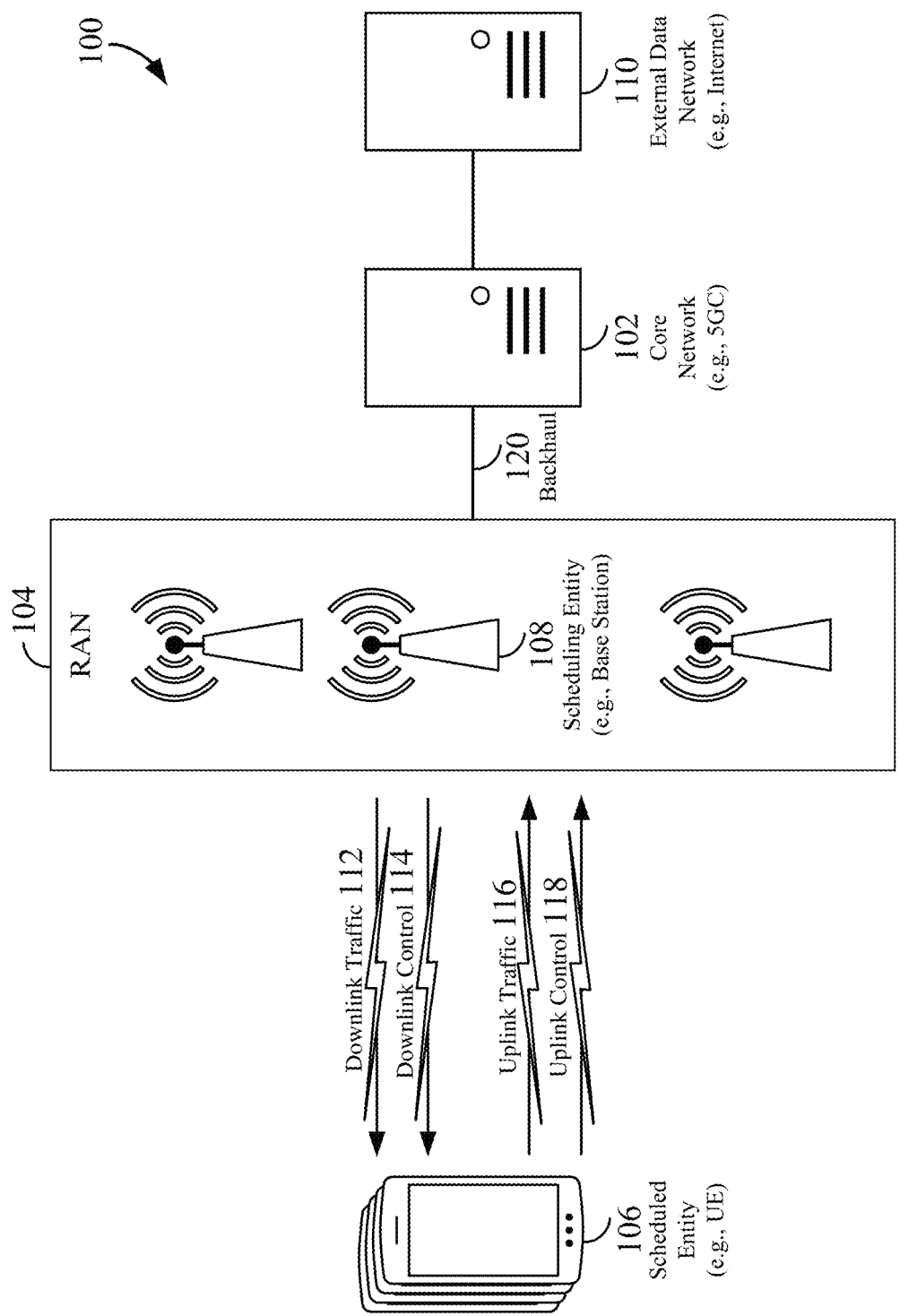
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As noted above, some wireless communication systems may be configured to distinguish between prioritized users and non-prioritized users, with prioritized users given preferential access to at least a portion of the shared wireless communication spectrum. A prioritized user may be, for example, an access terminal operated by a government entity, such as police, fire, military, or law enforcement, whereas non-prioritized users may be access terminals operated by civilians. In other examples, a prioritized user may refer to an access terminal operated by a user who has paid for prioritized user access (such as guaranteed bandwidth); whereas non-prioritized users may refer to access terminals operated by others who have not paid for prioritized user access. In another example, a prioritized user may be an access terminal operated by a customer of a particular wireless services vendor within a particular geographical area; whereas non-prioritized users may be access terminals operated by others who have roamed into that particular geographical area.

Within such systems, issues may arise in managing access to the shared communication spectrum by both prioritized users and non-prioritized users while preventing the non-prioritized users from interfering with the prioritized users. To address these or other issues, in one aspect, the network may forbid a non-prioritized user from accessing the shared communication spectrum (or a portion thereof) within a particular wireless access cell while a prioritized user is currently operating within that cell. For example, a database or lookup table may be maintained by the network operator that lists prioritized users. All other users are deemed to be non-prioritized users. So long as at least one prioritized user is currently operating within the particular wireless access cell, the non-prioritized users are forbidden to transmit signals within the shared communication spectrum (or within a portion of the spectrum the prioritized user is accessing, such as a particular sub-band of a frequency band).

Figure 14:
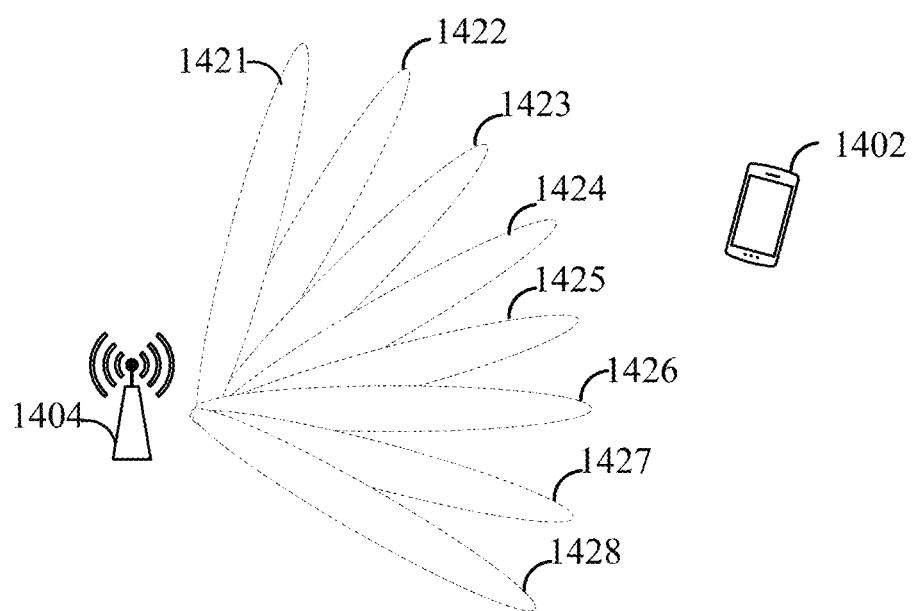
FIG. 14 is a diagram illustrating communication between a radio access network (RAN) node and a wireless communication device using downlink beamformed signals according to some aspects, wherein wireless transmissions are selectively delayed.

However, within at least some networks or within at least some frequency ranges, such a protocol may unnecessarily limit network access to non-prioritized users. For example, millimeter (MM) wave systems may allow for sufficiently precise beamforming so that a non-prioritized user may transmit in one particular direction without interfering with a prioritized user that is receiving/transmitting along a different direction. Beamforming is discussed below. Exemplary beams are illustrated in FIG. 14, also discussed below.

Aspects of the present disclosure provide for managing access to a shared wireless communication spectrum within networks that distinguish between prioritized users and non-prioritized users and address the aforementioned issues. Briefly, in some aspects, non-prioritized user access terminals may be forbidden from transmitting during one or more periodic sensing intervals, during which time a non-prioritized user access terminal seeking to access the shared spectrum senses an amount of signal energy transmitted from other wireless devices, such as access terminals of prioritized users (if any are currently operating). The energy may be sensed, for example, within a particular sub-band (or band segment) of a beam. If too much energy is detected (e.g., greater than a threshold level), the non-prioritized user access terminal may, e.g., switch to a different sub-band or beam and repeat the sensing process until a clear sub-band and/or beam is found. If none is found, the non-prioritized user access terminal may wait a short amount of time (e.g., a predetermined time period) and then repeat the sensing process. In this manner, even if a prioritized user access terminal is currently operating within the same coverage cell, the non-prioritized user access terminal is not necessarily forbidden from also operating within the coverage cell, so long as the non-prioritized access terminal operates at a different sub-band or on a different beam.

Thus, in some aspects, the non-prioritized user access terminal modifies transmission of wireless signals while an amount of sensed signal energy exceeds a sensed energy threshold. In some aspects, the non-prioritized user access terminal modifies the transmission by delaying the transmission until the amount of sensed signal energy no longer exceeds the sensed energy threshold. In other aspects, the non-prioritized user access terminal modifies the transmission by adjusting the transmission while the amount of sensed signal energy exceeds the sensed energy threshold by, for example, switching to a different sub-band or a different beam, reducing antenna gain, or by adjusting transmission parameters to lower a power spectral density (PSD) for the transmissions.

Additional issues arise in selecting suitable durations for various sensing intervals. Within some illustrative examples described below, the sensing intervals during which time the non-prioritized user access terminal is forbidden to transmit and instead senses for signal energy transmitted from other wireless devices may be each 100 microseconds (μs) in duration. Each sensing interval may be divided into twenty sensing slots, each 5 in duration. Within some illustrative examples, the non-prioritized user access terminal is no longer forbidden to transmit if (a) the sensed energy within each of the sensing slots of at least two consecutive sensing intervals is below a maximum permissible sensed energy threshold and (b) any discrepancy error between a transmit antenna gain and a receive antenna gain of the non-prioritized user device is also stable and below a maximum mismatch threshold. Note that whether the non-prioritized user access terminal is actually permitted to transmit may depend on various other factors such a quality of service (QoS) metrics and the like. In the following, it is assumed that no other factors prevent the non-prioritized user access terminal from transmitting.

Further issues can arise in implementing these features in systems that use various sub-bands and beams (having different directions). In at least some aspects, if the two criteria—(a) and (b)—are met for a particular sub-band and a particular beam, the non-prioritized user access terminal may then transmit on the particular beam within that particular sub-band upon the completion of the two sensing intervals and may continue to transmit for some predetermined amount of time (such as for some predetermined number of 100 μs transmission intervals). The transmissions may be, for example, uplink transmission or sidelink transmissions. The non-prioritized user access terminal may then suspend any transmissions during a next sensing interval and repeat the sensing procedure.

In at least some aspects, the non-prioritized user access terminal is permitted to resume transmissions if the two criteria—(a) and (b)—are again met for the particular sub-band and the particular beam. If during any sensing interval, the two criteria—(a) and (b)—are not met for a particular sub-band and a particular beam, the non-prioritized user access terminal may switch to a different sub-band and/or to a different beam, and repeat the sensing process in an effort to find a particular sub-band and/or particular beam that are clear for transmissions. As a practical matter, not all beams may be useful for a particular non-prioritized user access terminal, depending upon the current location within a coverage cell of the access terminal relative to nearby base stations or other access terminals. Nevertheless, in at least some examples, there may be some number of useful beams that a non-prioritized user access terminal may transmit on, and so sensing among those beams to find a clear beam (direction) may be helpful.

In some examples, a database is maintained to list prioritized users so that non-prioritized users may be distinguished from prioritized users. Copies of the database may be maintained within base stations and/or user devices (e.g., user access terminals). Upon entering a new coverage area, the database may be accessed to allow a roaming access terminal to determine whether the device qualifies as a prioritized user access terminal or a non-prioritized user access terminal within that coverage area. This may involve a local base station within the coverage area sending suitable indicator signals to the roaming access terminal once the access terminal is detected within the coverage area. In any situation in which a particular access terminal does not know whether it (the particular access terminal) is considered a prioritized user or a non-prioritized user in a given coverage area, the access terminal may be configured to assume by default that the access terminal is a non-prioritized user unless notified otherwise by a base station. In other examples, the access terminal is instead configured to assume by default that it (the access terminal) is a prioritized user unless notified otherwise by a base station. This later assumption may occasionally result in some interference issues if the access terminal begins transmitting signals that initially interfere with prioritized users. In such a situation, the base station may in due course notify the access terminal that the access terminal is non-prioritized to prevent further interference.

Note that in some cases a particular access terminal or other wireless device may be accessible by various users (human device operators), some of which are prioritized users while others are not within particular coverage areas. For example, prioritized users may enter a suitable credential that identifies them as prioritized users. In other cases, a particular access terminal may be a prioritized user for any and all who use the terminal with particular coverage areas. Herein, to avoid confusion between wireless access devices and the users of such devices, the terms prioritized user access terminal and non-prioritized access terminal will be used where appropriate. A prioritized user access terminal is an access terminal configured for prioritized access within the coverage area or service area the terminal is currently located in. A non-prioritized user access terminal is an access terminal not configured for prioritized access within the coverage area or service area the terminal is currently located in.

As already explained, some access terminals can be switched (reconfigured) from providing non-prioritized access to providing prioritized access upon entry of suitable credentials by an authorized user. Hence, a particular access terminal may be a non-prioritized user access terminal at one time and may become a prioritized user access terminal at later time, or vice versa. Moreover, an access terminal may switch from providing prioritized access to providing non-prioritized access (or vice versa) upon roaming into a coverage area or service area where the status of the access terminal changes. Within descriptions herein where the priority of a particular access terminal is not pertinent to the descriptions, other terms for access terminals may be used interchangeably such a user equipment (UE), scheduled entity, or wireless communication device.

Note also that other terms may be used rather than prioritized/non-prioritized to refer to the same or similar concepts, such as privileged vs. non-privileged, first tier vs. second tier, upper tier vs. lower tier, licensed vs. unlicensed, authorized vs. unauthorized, certified vs. non-certified, primary vs. secondary, premium vs. standard, preferred vs. non-preferred, essential vs. non-essential, etc.

In some examples, the various parameters that specify the details of the sensing procedure (such as the duration of sensing intervals and sensing slots, the various thresholds to be used, the number of sensing intervals that must be found to be clear, etc.) are configurable parameters, and the examples herein are merely illustrative. Note also that to provide that the sensing intervals used by all non-prioritized access terminals are aligned with one another, a set of new sensing intervals may be set to begin once every 5 milliseconds (ms) commencing at some initial reference time (such as 00:00:00 on Gregorian calendar date 1 Jan. 1900). Within a particular terrestrial coverage cell, any time-tracking differences (due to the finite speed of light) between one access terminal and another or between an access terminal and a base station is expected to be minimal.

In at least some examples, these procedures are implemented within a wireless communication network is configured in accordance with 3rd Generation Partnership Project (3GPP) New Radio (NR) specifications (often referred to as 5G NR or just 5G).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

It should be understood that the above examples are not necessarily intended to limit claimed subject matter. For example, unless specifically recited, claimed subject matter relating to wireless communications is not necessarily intended to be limited to any particular author/entity defined frequency band, or the like.

In at least some examples, the systems and procedures described herein are implemented within the so-called "Lower 37 GHz band," which extends from 37.0 GHz to 37.6 GHz and which may be subdivided into six sub-bands, each 100 MHz wide. However, this is just one example and at least some of the techniques described herein are applicable in any suitable frequency band or sub-band, including unlicensed frequency bands. Generally speaking, at least of the techniques described herein are applicable within any wireless communication system or network that distinguishes between prioritized user access and non-prioritized user access. (Note that the distinction here is not between prioritized packets vs. non-prioritized packets.)

Before discussing the and other techniques in detail, an overview of a wireless communication system is provided. However, it is noted that the various concepts presented throughout this disclosure may be implemented across a broad variety of telecommunication systems, network architectures, and communication standards.

Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a UE 106, which may be an access terminal. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3GPP New Radio (NR), often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a RAN (e.g., RAN 104) responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP NR standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a base stations (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. (e.g., UEs 106). That is, for scheduled communication, UEs 106, which may be scheduled entities, may utilize resources allocated by the scheduling entity (e.g., base station 108).

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities 106 (e.g., one or more UEs 106) to the scheduling entity 108. On the other hand, the scheduled entity 106 (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
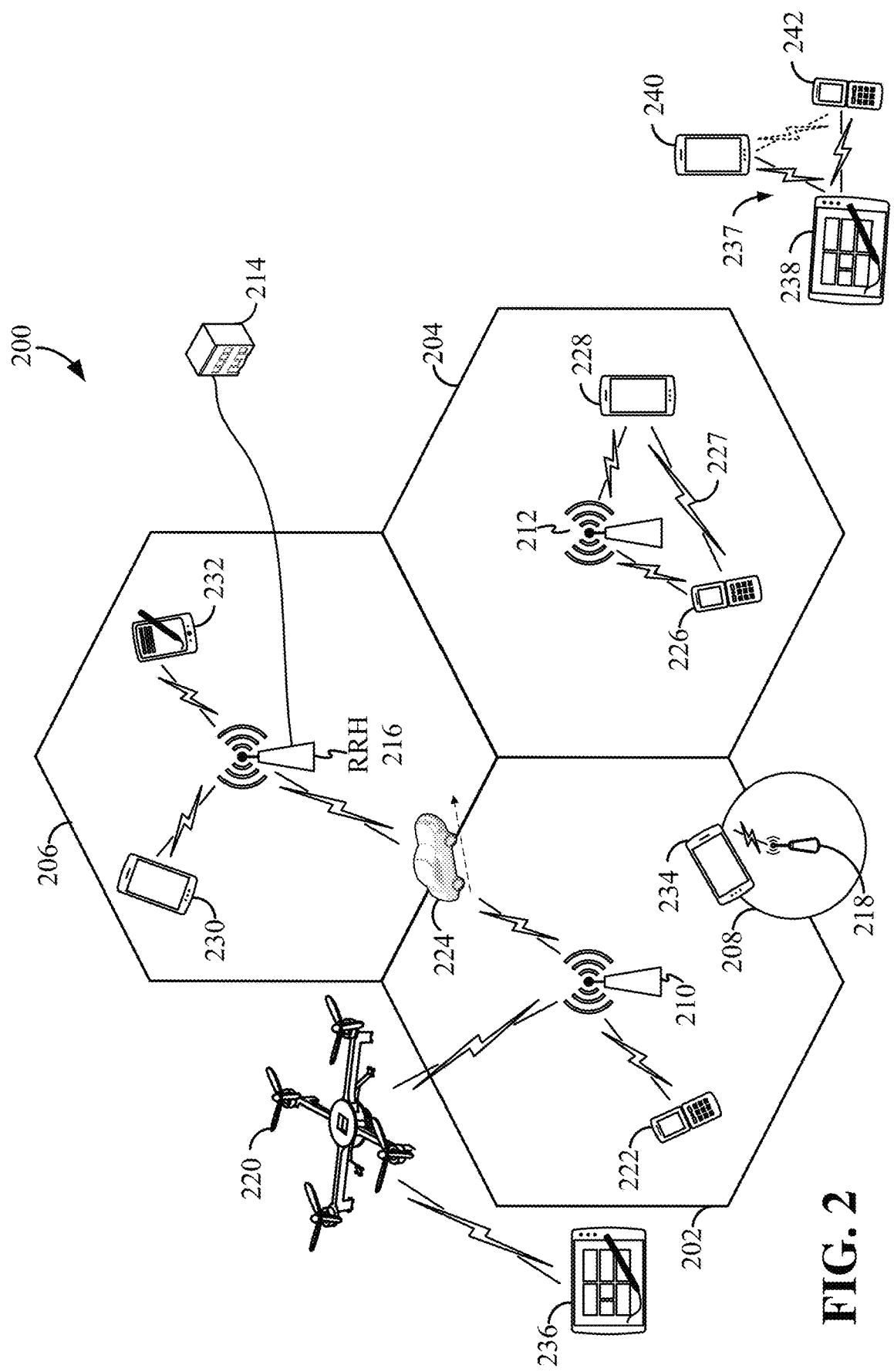
FIG. 2 is an illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a UE based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, and 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same or similar to the UE/scheduled entity 106 described above and illustrated in FIG. 1.

In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the RAN are generally set up, maintained, and released under the control of an access and mobility management function (AMF, not illustrated, part of the core network 102 in FIG. 1). In some scenarios, the AMF may include a security context management function (SCMF) and a security anchor function (SEAF) that performs authentication. The SCMF can manage, in whole or in part, the security context for both the control plane and the user plane functionality.

In some examples, the RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of the parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In order for transmissions over the RAN 200 to obtain a low block error rate (BLER) while still achieving very high data rates, channel coding may be used. That is, wireless communication may generally utilize a suitable error correcting block code. In a typical block code, an information message or sequence is split up into encoded code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using polar coding, based on nested sequences. For at least some of the channels, puncturing, shortening, and repetition are used for rate-matching.

However, those of ordinary skill in the art will understand that aspects of the present disclosure may be implemented utilizing any suitable channel code. Various implementations of scheduling entities and scheduled entities may include suitable hardware and capabilities (e.g., an encoder, a decoder, and/or a CODEC) to utilize one or more of these channel codes for wireless communication.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, where technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
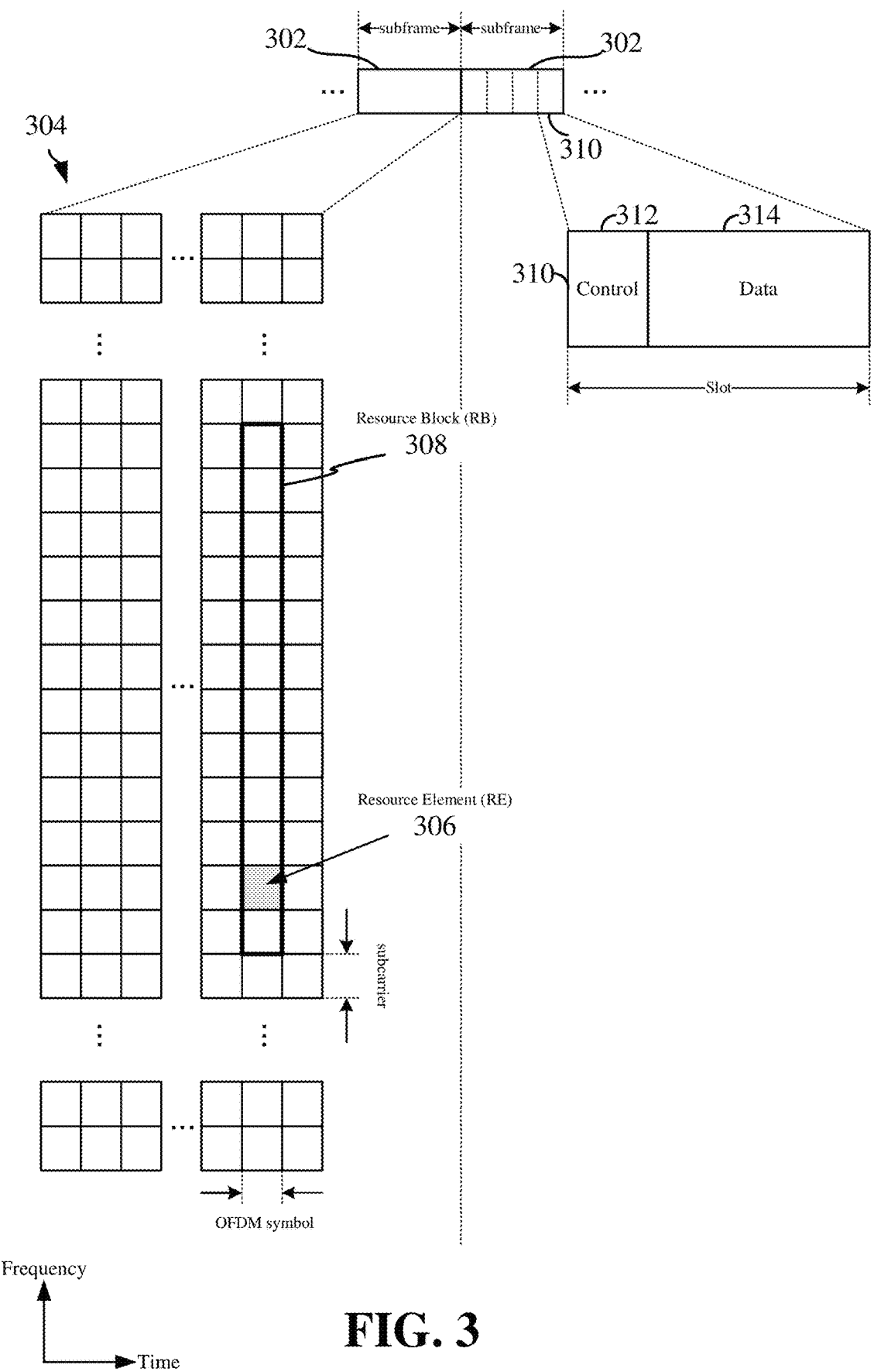
FIG. 3 is a diagram illustrating an example of a frame structure for use in a radio access network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more REs 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). The mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. The pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESETO), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission, The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

Figure 4:
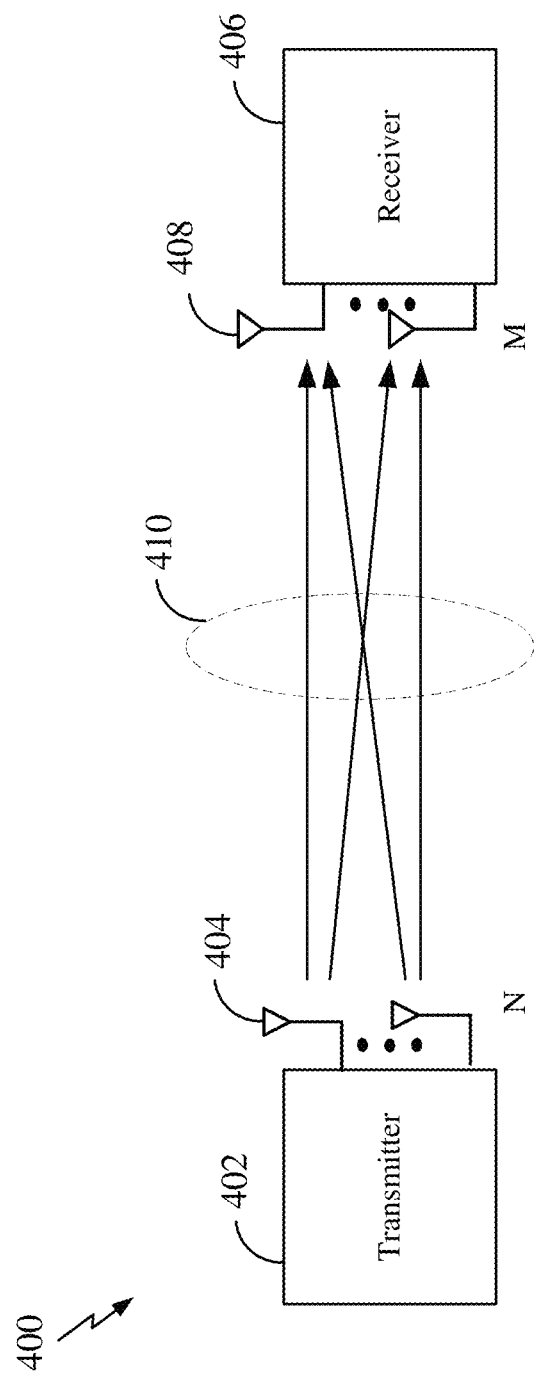
FIG. 4 is a block diagram illustrating a wireless communication system supporting beamforming and/or multiple-input multiple-output (MIMO) communication according to some aspects.

In some aspects, the scheduling entity and/or the scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback channel state information (CSI). The CSI may include, for example, a channel quality indicator (CQI) that indicates to the base station a modulation and coding scheme (MCS) to use for transmissions to the UE, the RI that indicates to the base station the number of layers to use for transmissions to the UE, a precoding matrix indicator (PMI) that indicates to the base station the precoding matrix to use for transmissions to the UE, and other suitable parameters.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. (See, FIG. 14, discussed below, for example of beams.) Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 5:
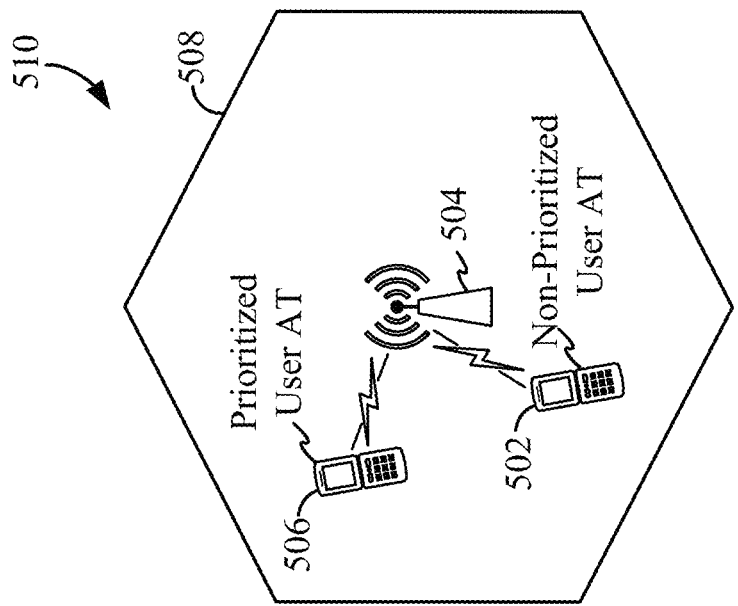
FIG. 5 is a diagram illustrating exemplary access scenarios during which a non-prioritized user access terminal may attempt to access a wireless network that also includes a prioritized user access terminal in accordance with some aspects.
Figure 5:
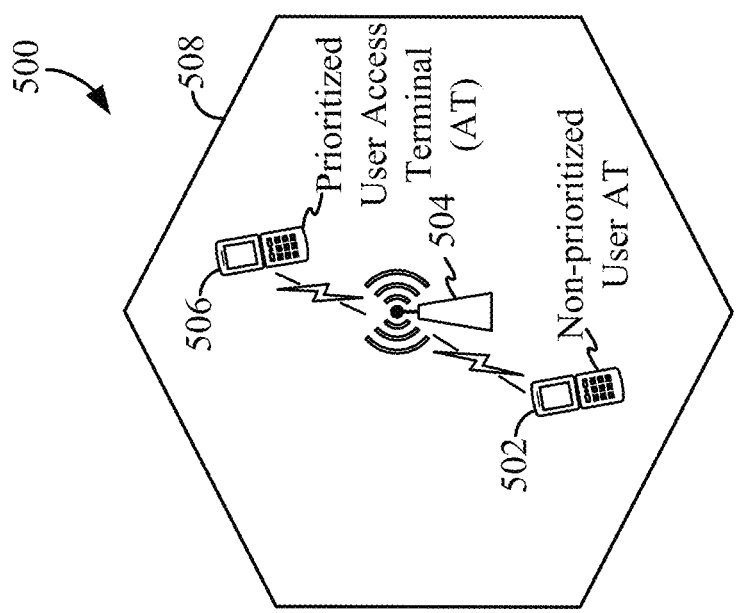

FIG. 5 illustrates a first access scenario 500 wherein a non-prioritized user access terminal 502 seeks to transmit signals on a beam in the direction of a base station 504 while a prioritized user access terminal 506 is transmitting signals to the same base station 504 on a beam having a direction in which signals from the non-prioritized user access terminal 502 may interfere with signals from the prioritized user access terminal 506. In this first scenario, upon performing the non-prioritized access procedure summarized above and described elsewhere in detail herein, the non-prioritized user access terminal 502 may sense energy on a beam having the direction in which the non-prioritized user access terminal 502 seeks to transmit (e.g., energy above a threshold) and may then delay any transmissions until the prioritized user access terminal 506 has either stopped transmitting or has moved sufficiently relative to the non-prioritized user access terminal 502 so that interference is no longer a concern (or the non-prioritized user access terminal 502 may switch to a different sub-band, if one is available).

FIG. 5 also illustrates a second non-prioritized access scenario 510 wherein the non-prioritized user access terminal 502 again seeks to transmit signals on a beam toward a base station 504, but now the prioritized user access terminal 506 has moved. In this second scenario, upon performing the non-prioritized access procedure summarized above, the non-prioritized user access terminal 502 may no longer sense energy (e.g., energy above a threshold) from the prioritized user access terminal 506 on a beam having the direction in which the non-prioritized user access terminal 502 seeks to transmit, and therefore, the non-prioritized user access terminal 502 may initiate transmissions. Hence, upon completion of the sensing intervals discussed above (and assuming there is no significant receiver gain/transmitter gain mismatch), the non-prioritized user access terminal 502 may begin transmissions (also assuming there are no other issues that would prevent transmissions such as QoS issues or the like).

Figure 6:
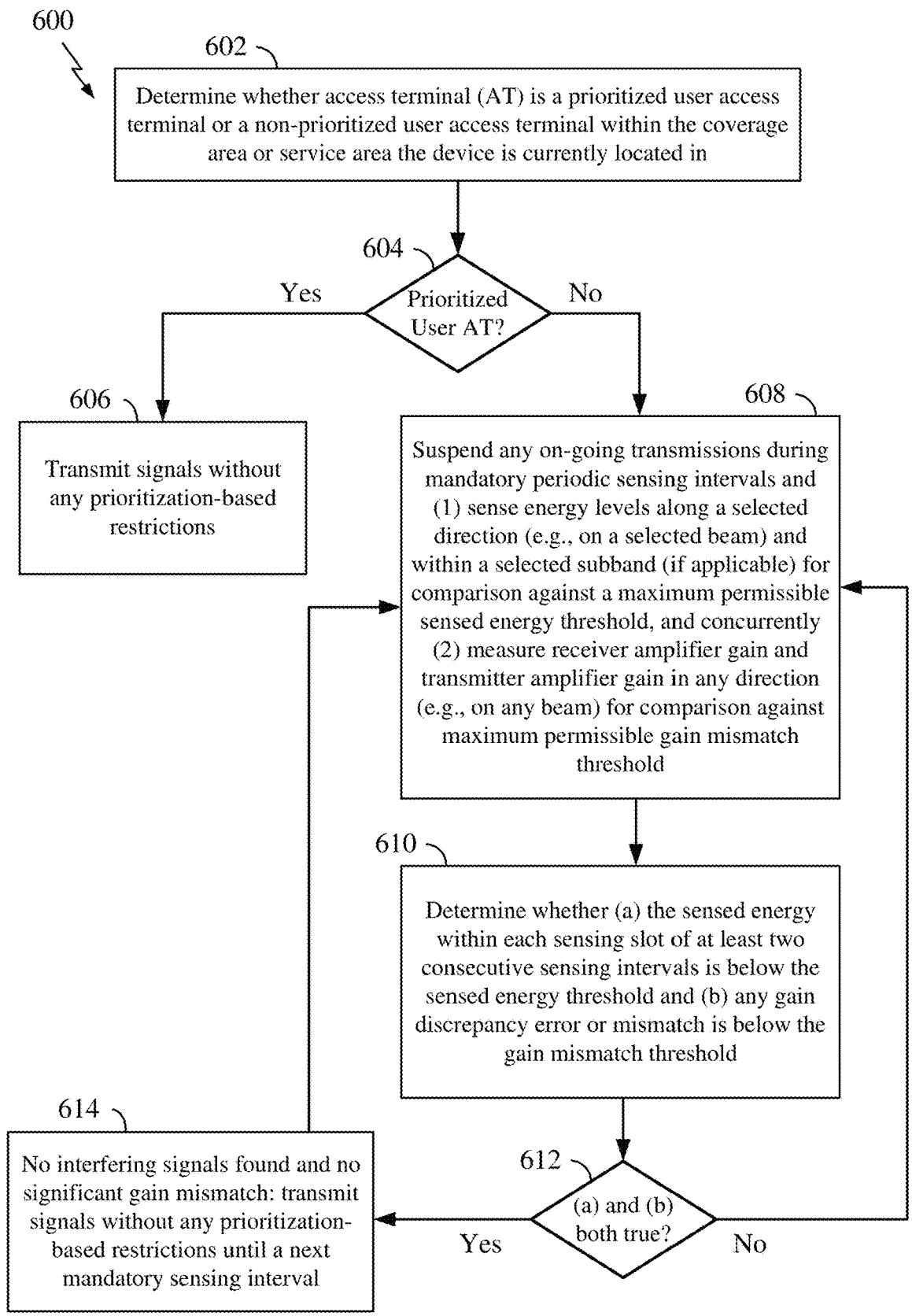
FIG. 6 is a flow chart illustrating a wireless communication method for use by a non-prioritized user access terminal in accordance with some aspects.

FIG. 6 is a flow chart illustrating an exemplary process 600 that may be performed by an access terminal (such as a UE or other scheduled entity). Beginning at block 602, the access terminal determines whether the access terminal qualifies as a prioritized user access terminal or a non-prioritized user access terminal within the coverage area or service area the access terminal is currently located in. This may be achieved by accessing suitable databases within the access terminal that list prioritized users or by receiving indicator signals from a base station. In situations in which the access terminal cannot determine whether the access terminal qualifies as a prioritized user or a non-prioritized user in its current coverage area, the access terminal may be configured to assume by default that the access terminal is a non-prioritized user unless notified otherwise by a base station. In other examples, the access terminal instead assumes by default that the access terminal is a prioritized user unless notified otherwise by a base station.

If the access terminal qualifies as a prioritized user access terminal, as indicated by decision block 604, the access terminal can then transmit signals without any prioritization-based restrictions at block 606 (although there may be other restrictions based on QoS or other factors). The access terminal may continue to transmit signals without prioritization-based restrictions until the access terminal roams into a new coverage area. Although not shown in FIG. 6, if the access terminal enters a new coverage area during block 606, the access terminal repeats the operations of block 602 to determine whether the access terminal is still a prioritized user. Other situations may also cause the access terminal to update its determination at block 602, such as if a current user logs off the device and another user logs on (since the second user may not be a prioritized user).

On the other hand, if the access terminal is a non-prioritized user access terminal, as indicated at decision block 604, the access terminal then performs a clearance procedure intended to determine whether the access terminal can nevertheless transmit even though the access terminal is not a non-prioritized user access terminal. The clearance procedure begins at block 608, during which time the access terminal suspends any on-going transmissions during periodic sensing intervals. In other words, during the periodic sensing intervals, the access terminal is forbidden to transmit any signals. In some examples, the sensing intervals may be each 100 microseconds (µs) in duration commencing every 5 ms. Each sensing interval may be divided, for example, into twenty sensing slots, each 5 µs in duration. Other suitable sensing interval durations and periodicities are also possible in various aspects. At block 608, the access terminal (1) senses energy levels along a selected direction (e.g., on a selected beam) and within a selected sub-band or band segment (if applicable) for comparison against a maximum permissible sensed energy threshold. For example, the energy may be sensed during each sensing slot of each sensing interval. In some particular examples, the detected or sensed energy in each of the sensing slots is compared against a sensed energy threshold ED_S=−xx, where xx is an adjustable parameter.

Concurrently, during block 608, the access terminal (2) also measures receiver amplifier gain and transmitter amplifier gain (on any beam) during each of the sensing slots for comparison against a maximum permissible gain mismatch (discrepancy) threshold. In some particular examples, the receiver antenna beam gain utilized for sensing must be no more than 6 dB lower than the antenna gain of the intended transmitter beam gain in any direction (e.g., on any beam) and must remain unchanged during at least K=2 consecutive sensing intervals. In another particular example, 10 dB is used instead of 6 dB. Hence, in some aspects, the access terminal determines an amount of gain mismatch between a receiver antenna gain of the access terminal and a transmitter antenna gain of the access terminal during the one or more sensing intervals.

At block 610, the access determines terminal whether both (a) the sensed energy within each sensing slots of at least two consecutive sensing intervals is below the sensed energy threshold and (b) any gain discrepancy error is also below the gain mismatch threshold within each of the sensing slots of the at least two consecutive sensing intervals.

At decision block 612, if either condition (a) or (b) is false (e.g., either condition is not met for the selected direction/sub-band), then the particular combination of direction (beam) and sub-band is not clear and processing returns to block 608, where the access terminal may select a different sub-band and/or a different beam and repeat the sensing process. In other examples, the access terminal may just wait some period of time to sense again with the same combination of beam and sub-band. The procedure of blocks 608 and 610 may be repeated many times before both conditions (a) and (b) are met.

At decision block 612, if both conditions (a) and (b) are true (e.g., the conditions are both met for a selected beam/sub-band), then that particular combination of beam and sub-band/segment is clear at least for the time being, and processing proceeds to block 614. At block 614, since no interfering signals were found and no significant gain mismatch was found, the access terminal is permitted to transmit signals until a next sensing interval without any prioritization-based restrictions. Again, other restrictions might prevent the access terminal from transmitting but no prioritization-based restrictions are imposed during this time due to the non-prioritized status of the access terminal.

The period of time during which the access terminal may transmit signals during block 614 is a configurable parameter (as are the various other parameters that define the clearance procedure), but in some examples, the access terminal is permitted to transmit for some predetermined integer number of 100 µs intervals. In one example, if K sensing intervals are needed for clearance to transmit, then the access terminal is permitted to transmit during the next K intervals or during some other configurable number of intervals. In other examples, the access terminal is permitted to transmit until the next reference boundary (which occurs every 5 ms). Hence, in that example, the access terminal is permitted to transmit for whatever amount of time is left before the next 5 ms reference boundary (where the amount of time left will depend on how many sensing intervals were required before the access terminal found a clear combination of beam and sub-band). Hence, in some aspects, the wireless signals are transmitted following the aforementioned one or more sensing intervals in response to determination that (a) the amount of signal energy does not exceed the sensed energy threshold and (b) the amount of gain mismatch does not exceed a separate gain mismatch threshold.

Although not shown in FIG. 6, if the access terminal enters a new coverage area during blocks 608, 610, or 614, the access terminal repeats block 602 to determine whether the access terminal is still a non-prioritized user. Other situations may also cause the access terminal to update its determination at block 602, such as if a current user logs off the device and another user logs on (since the second user may not be a prioritized user).

Figure 7:
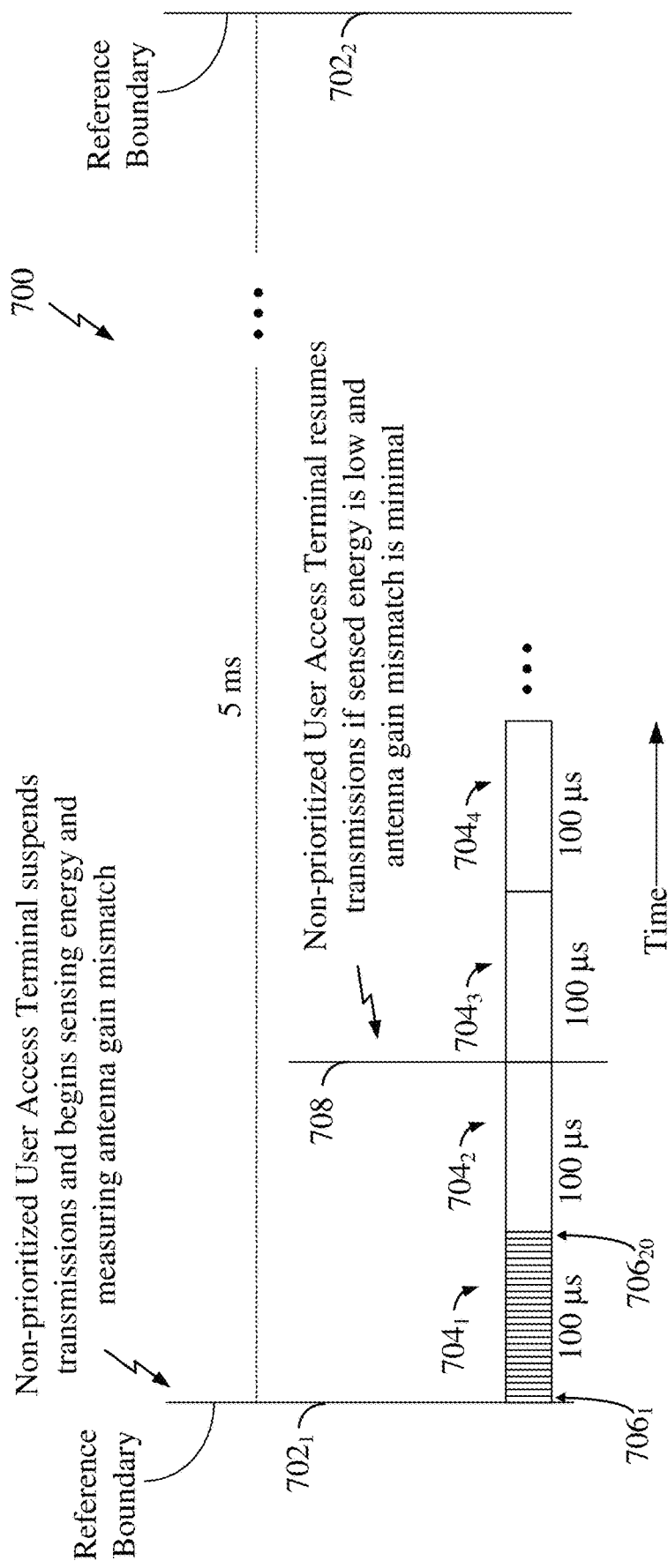
FIG. 7 is a timing diagram illustrating exemplary sensing intervals and slots in accordance with some aspects.

FIG. 7 illustrates an exemplary timeline 700, showing an exemplary pair of consecutive reference time boundaries $702_1$ and $702_2$ that are, in this example, 5 ms apart. As noted above, the reference times boundaries may be tracked relative to an initial reference time (such as 00:00:00 on Gregorian calendar date 1 Jan. 1900). The timeline 700 also shows a set of sensing intervals $704_1$, $704_2$, etc., which are, in this example, each 100 µs in duration. Each sensing interval may be subdivided into sensing slots $706_1$, $706_2$, . . . , $706_{20}$, which are, in this example, each 5 µs in duration. In the figure, the individual sensing slots are shown within only the first of the sensing intervals but it should be understood that each sensing intervals may be subdivided into slots.

Beginning at reference time boundary $702_1$, the non-prioritized user access terminal suspends any transmissions and begins sensing energy within each slot (on a particular beam and measuring antenna gain mismatch (on any beam). In the example of FIG. 7, two (K=2) consecutive sensing intervals must be found to be clear where, as already explained, the sensed energy (one a selected beam/sub-band) must be below a sensed energy threshold within each of the slots of the consecutive sensing intervals and any antenna gain mismatch (on any beam) must be below a gain mismatch/discrepancy threshold. In the example of FIG. 7, these conditions are met and so, beginning at time 708, the non-prioritized user access terminal resumes any transmissions, and may continue to transmit until the next reference time boundary $702_2$.

If, instead, the clearance conditions are not met during consecutive sensing intervals $704_1$ and $704_2$, then the access terminal examines the next pair of consecutive sensing intervals $704_2$ and $704_3$, and so on, until a consecutive pair of sensing intervals establish clearance. As noted, the access terminal may switch to a different sub-band/segment or change the intended transmission direction (e.g., beam) in an effort to find a clear combination of beam/sub-band. In some cases, no clear combination might be available, in which case no transmissions are permitted, at least until other prioritized user access terminals have stopped transmitting. As a practical matter, in many cases the non-prioritized access terminal will find some combination of beam/sub-band that will permit the non-prioritized access terminal to begin (or resume) transmissions despite on-going transmissions from prioritized access terminals, thus increasingly overall network bandwidth compared to networks that would simply block all non-prioritized user access terminals whenever a prioritized user access terminal is operating in the same overage cell or service area.

In some aspects, a set of exemplary and non-limiting parameters and exemplary and non-limiting rules may be summarized as follows:

(a) Reference boundaries based on Coordinated Universal Time (UTC) are defined to enable medium sensing for the protection of the prioritized users of the band or a band segment. The reference boundaries repeat every N=5 ms, starting from 00:00:00 on Gregorian calendar date 1 Jan. 1900 (midnight between Sunday, Dec. 31, 1899 and Monday, Jan. 1, 1900).

(b) Authorized non-prioritized users of the band or a band segment shall not transmit during the sensing interval, defined as the first n1=100 µs following the reference boundaries and further divided into consecutive sensing slots of n2=n1/m=5 µs each.

(c) The receiver antenna beam gain utilized for sensing shall be no more than n3=6 (or 10) dB lower than the antenna gain of the intended transmitter beam gain on any beam (e.g., in any direction) and shall remain unchanged during at least K=2 consecutive sensing intervals.

(d) Authorized non-prioritized uses may utilize the band or a band segment only if within the last M=200 µs the sensing is performed on the corresponding receiver beam as defined in c) and the detected or sensed energy in each of the sensing slots is below ED_S=−xx sensed energy threshold.

Figure 8:
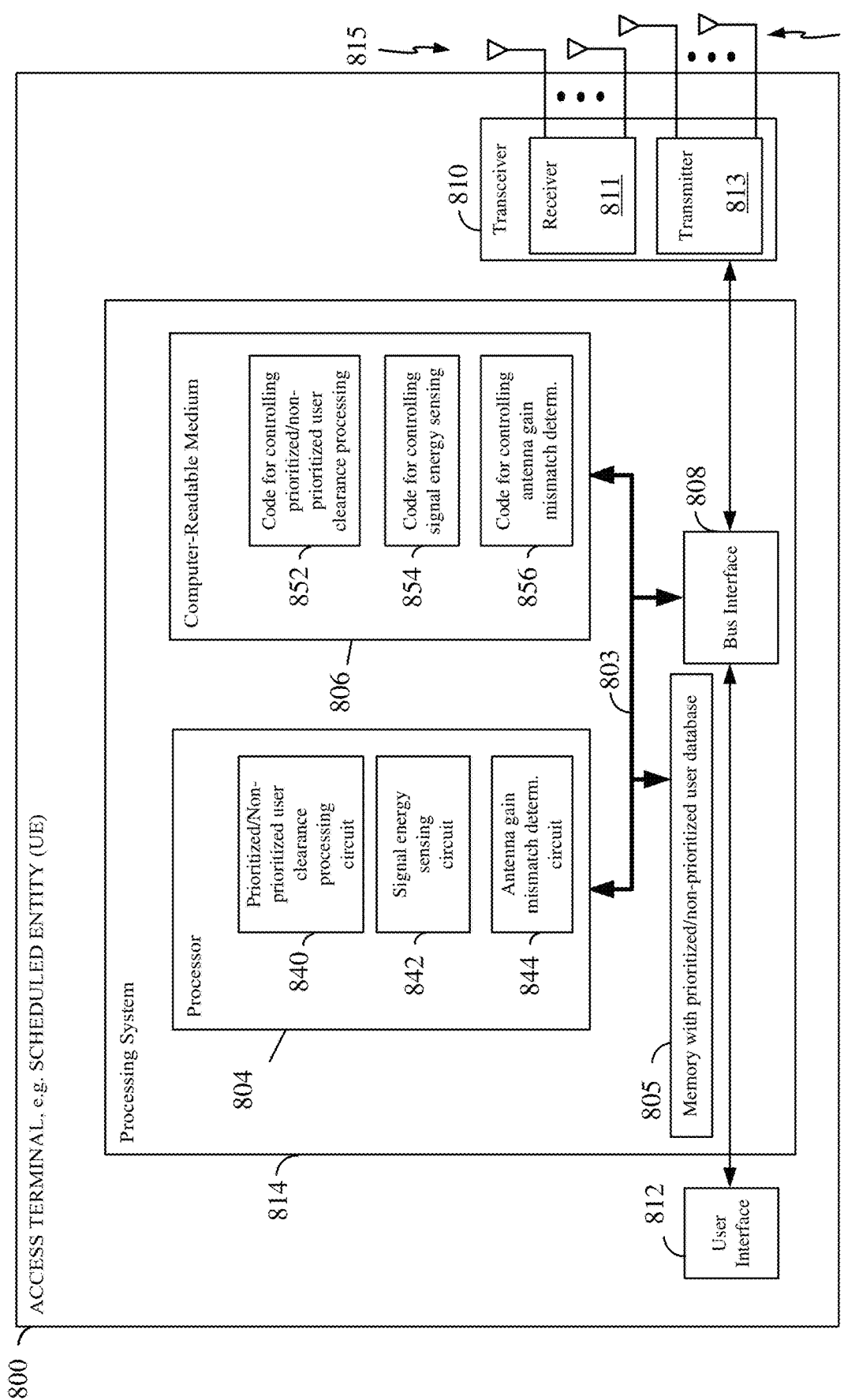
FIG. 8 is a block diagram illustrating an example of a hardware implementation for an access terminal according to some aspects.

FIG. 8 is a block diagram illustrating an example of a hardware implementation for an access terminal 800, e.g., scheduled entity, employing a processing system 814 capable of controlling and performing non-prioritized user clearance processing according to some aspects.

In one example, the access terminal 800 of FIG. 8 may be a UE, such as any of the UEs of FIG. 1, 2, or 5. The access terminal 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the access terminal 800 may be configured to perform any one or more of the functions described herein. That is, the processor 804, as utilized in an access terminal 800, may be used to implement any one or more of the processes and procedures described elsewhere herein, such as illustrated in FIG. 6, discussed above, and in FIG. 10 or 11, discussed below The processor 804 may in some instances be implemented via a baseband or modem chip and in other implementations, the processor 804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In the example of FIG. 8, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. The transceiver 810 may be connected to an antenna array 815 that can be configured for transmitting and/or receiving a plurality of beams (e.g., transmit beams and receive beams) using beamforming techniques. The transceiver 810 includes one or more receivers 811 and one or more transmitters 813. The receiver(s) 811 are coupled to a set of antennas 815 (e.g., one or more antenna arrays). The transmitter(s) 813 are coupled to the same or a different set of antennas 817 (e.g., one or more antenna arrays). The sets of antennas may be used for beamforming. Different RF receiver chains may be provided within receivers 811. Moreover, as explained above, the receiver and transmitter may have separate gains, which can be separately measured.

Depending upon the nature of the apparatus, a user interface 1512 (e.g., keypad, display, speaker, microphone, joystick) may also be provided. Of course, such a user interface 1512 is optional, and may be omitted in some examples, such as a base station.

In some aspects of the disclosure, the processor 804 may include circuitry configured to implement one or more of the functions described elsewhere herein, e.g., for controlling non-prioritized access. In some aspects, the processor 804 may include a prioritized/non-prioritized user clearance processing circuit 840, a signal energy sensing circuit 842, and an antenna gain mismatch determination circuit 844.

In some aspects, the signal energy sensing circuit 842 is operative to sense, in response to a determination (made by the prioritized/non-prioritized user clearance processing circuit 840) that the access terminal is a non-prioritized user access terminal, an amount of signal energy within a frequency band of the wireless communication network during one or more sensing intervals using the transceiver.

In some aspects, the transceiver 810 is operative to transmit wireless signals following the one or more sensing intervals, in response to a determination (made by the prioritized/non-prioritized user clearance processing circuit 840) that the amount of signal energy does not exceed a sensed energy threshold during the one or more sensing intervals.

In some aspects, the prioritized/non-prioritized user clearance processing circuit 840 is operative to modify transmission of the wireless signals by the transceiver 810, in response to a determination that the amount of signal energy exceeds the sensed energy threshold, while an amount of additional signal energy sensed during one or more subsequent sensing intervals exceeds the sensed energy threshold. In some aspects, the prioritized/non-prioritized user clearance processing circuit 840 is operative to modify the transmission of the wireless signals by delaying transmission until the amount of additional signal energy sensed during one or more subsequent sensing intervals no longer exceeds the sensed energy threshold. In some aspects, the prioritized/non-prioritized user clearance processing circuit 840 is operative to modify the transmission of the wireless signals by adjusting transmission to reduce transmission power during a period of time until the amount of signal energy no longer exceeds the sensed energy threshold. For example, the transmission may be adjusted by switching to a different sub-band or a different beam, reducing antenna gain, or by adjusting transmission parameters to lower a PSD for the transmissions In some aspects, the prioritized/non-prioritized user clearance processing circuit 840 may include processing circuitry configured to: determine that the access terminal 800 is a non-prioritized user access terminal within a wireless communication network that serves prioritized user access terminals and non-prioritized user access terminals (using, for example, information stored within memory 805 including, e.g. a prioritized/non-prioritized user database); control the signal energy sensing circuit 842 to sense an amount of signal energy within a frequency band of the wireless communication network during one or more sensing intervals; control the antenna gain mismatch determination circuit 844 to determine whether the amount of signal energy sensed during the one or more sensing intervals exceeds a sensed energy threshold; control the transceiver 810 to transmit wireless signals following the one or more sensing intervals, in response to a determination that the amount of signal energy does not exceed the sensed energy threshold during the one or more sensing intervals (prior to the transmission); and modify the transmission of the wireless signals by the transceiver 810, in response to a determination that the amount of signal energy exceeds the sensed energy threshold, while an amount of additional signal energy sensed during one or more subsequent sensing intervals exceeds the sensed energy threshold, in accordance with the various processes illustrated in FIGS. 6-7. As already explained, in some aspects, modifying the transmission may include delaying transmission until the amount of additional signal energy sensed during one or more subsequent sensing intervals no longer exceeds the sensed energy threshold. In other aspects, modifying the transmission may include adjusting transmission parameters such as minimizing antenna gain during the period of time until the amount of additional signal energy sensed during one or more subsequent sensing intervals no longer exceeds the sensed energy threshold.

In some aspects, the prioritized/non-prioritized user clearance processing circuit 840 includes processing circuitry configured to: control the transceiver 810 to transmit wireless signals following the one or more sensing intervals in response to a determination that (a) the amount of signal energy does not exceed the sensed energy threshold and (b) an amount of gain mismatch determined by the antenna gain mismatch determination circuit 844 does not exceed a separate gain mismatch threshold, in accordance with the various processes illustrated in FIGS. 6-7. In some aspects, the signal energy sensing circuit 842 includes processing circuitry configured to: sense an amount of signal energy within a frequency band of the wireless communication network during one or more sensing intervals using transceiver 810, in accordance with the various processes illustrated in FIGS. 6-7. In some aspects, the antenna gain mismatch determination circuit 844 includes processing circuitry configured to: determine an amount of gain mismatch between a receiver antenna gain of the transceiver 810 and a transmitter antenna gain of the transceiver 810 during the one or more sensing intervals, in accordance with the various processes illustrated in FIGS. 6-7.

The processor 804 is therefore configured such that non-prioritized user access can be managed and controlled by the access terminal 800 to address the issues discussed above. In some aspects, the circuitry for managing and controlling non-prioritized user access may include the prioritized/non-prioritized user clearance processing circuit 840, the signal energy sensing circuit 842, and the antenna gain mismatch determination circuit 844.

The processor 804 is also responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The computer-readable medium 806 may include software executable by the processor 804 configured to implement one or more of the functions described elsewhere herein. For example, the computer-readable medium 806 may include code 852 executable by the prioritized/non-prioritized user clearance processing circuit 840 for controlling prioritized/non-prioritized user clearance processing, code 854 executable by the signal energy sensing circuit 842 for controlling signal energy sensing, and code 856 executable by the antenna gain mismatch determination circuit 844 for controlling antenna gain mismatch determination.

In some aspects, the prioritized/non-prioritized user clearance processing circuit 840 or components thereof provide a means for determining whether the access terminal is a non-prioritized user access terminal (within the wireless communication network that serves prioritized user access terminals and non-prioritized user access terminals). The signal energy sensing circuit 842 provides a means for sensing an amount of signal energy within a frequency band of the wireless communication network during one or more sensing intervals. The antenna gain mismatch determination circuit 844 provides a means for determining an amount of gain mismatch between a receiver antenna gain of the access terminal and a transmitter antenna gain of the access terminal. The prioritized/non-prioritized user clearance processing circuit 840 or components thereof also provide: a means for determining whether the amount of signal energy sensed during the one or more sensing intervals exceeds a sensed energy threshold; a means for controlling a transmitter (e.g. transceiver 810) to transmit wireless signals following the one or more sensing intervals, in response to a determination that the amount of signal energy does not exceed the sensed energy threshold during the one or more sensing intervals; and a means for modifying transmission of the wireless signals, in response to a determination that the amount of signal energy exceeds the sensed energy threshold, while an amount of additional signal energy sensed during one or more subsequent sensing intervals exceeds the sensed energy threshold.

Figure 9:
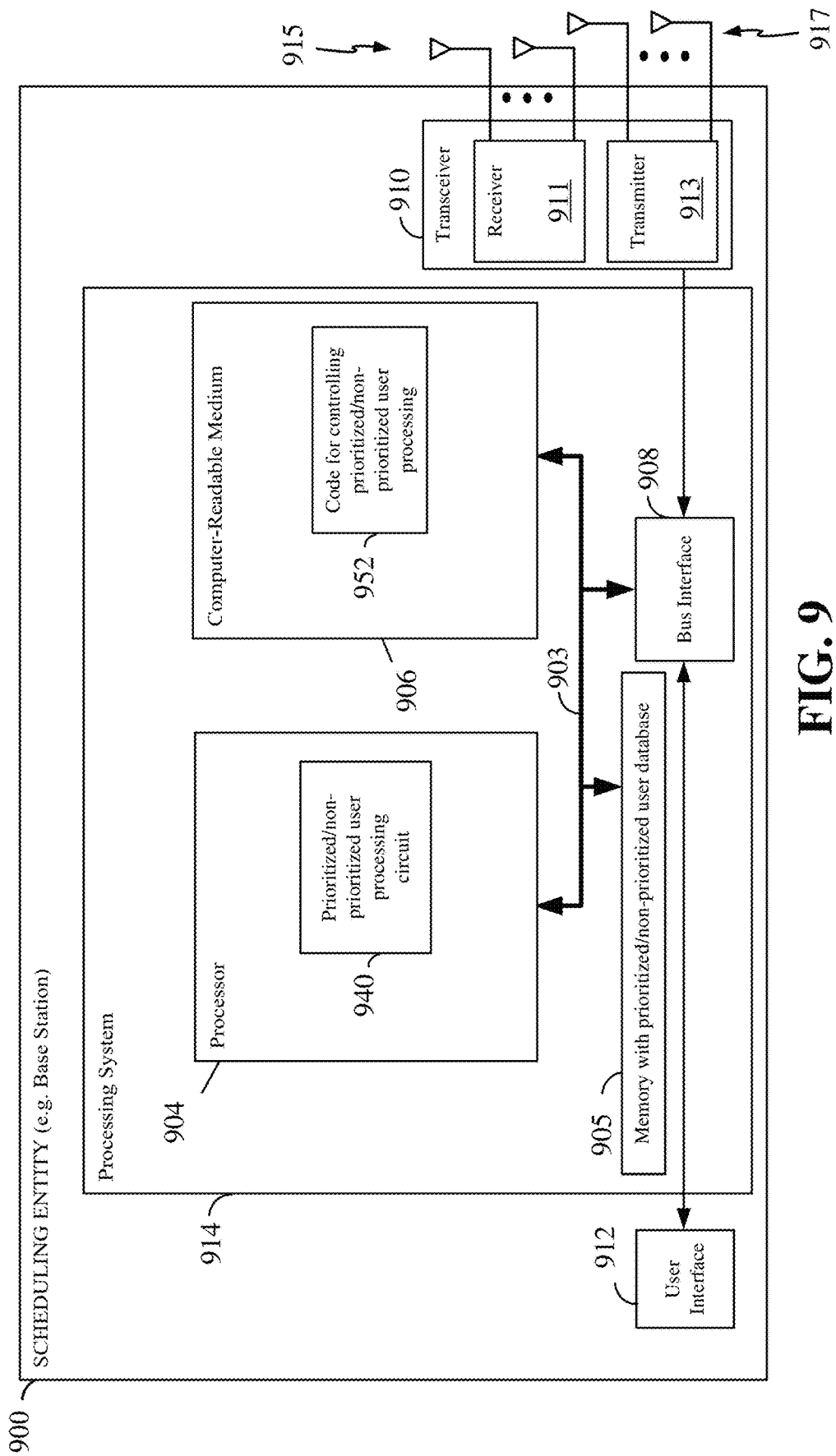
FIG. 9 is a block diagram illustrating an example of a hardware implementation for a scheduling entity (such as a base station) according to some aspects.

FIG. 9 is a block diagram illustrating an example of a hardware implementation for an exemplary scheduling entity 900, e.g., a base station, employing a processing system 914. In accordance with various aspects of the disclosure, an element, or any portion of an element, or any combination of elements may be implemented with a processing system 914 that includes one or more processors 904. For example, the scheduling entity 900 may be a gNB as illustrated in any one or more of the other figures.

The processing system 914 may be generally similar to the processing system 814 illustrated in FIG. 8, including a bus interface 908, a bus 902, memory 905, a processor 904, a computer-readable storage medium 906, a user interface 912, and a transceiver 910 (a communication interface) similar to those described above, and so many of the details of the system architecture will not be described again. The transceiver 910 provides a communication interface or means for communicating with various other apparatus over a transmission medium. The transceiver 910 includes one or more receivers 911 and one or more transmitters 913. The receiver(s) 911 are coupled to a set of antennas 915 (e.g., one or more antenna arrays). The transmitter(s) 913 are coupled to the same or a different set of antennas 917 (e.g., one or more antenna arrays). The sets of antennas may be used for beamforming. Moreover, as explained above, the receiver and transmitter may have separate gains, which can be separately measured.

The processor 904, as utilized in a scheduling entity 900, may be used to implement one or more of the various processes described herein for use by scheduled entities. In some aspects of the disclosure, the processor 904 includes a prioritized/non-prioritized user processing circuit 940 configured, for example, for notifying access terminals (UEs) whether they are prioritized or non-prioritized user access terminals (based on information contained within a database within memory 905), and to perform other related functions. In some aspects, the prioritized/non-prioritized user processing circuit 940 includes processing circuitry configured to: determine whether an access terminal corresponds to a prioritized or a non-prioritized user to transmit an indicator signals using transceiver 910, in accordance with the various processes illustrated in FIGS. 6-7.

The computer-readable storage medium 906 may include software configured to implement one or more of the functions described elsewhere herein. For example, the computer-readable storage medium 906 may include code 952 executable by the processor 904 for processing controlling prioritized/non-prioritized user processing. For example, the computer-readable storage medium 906 may include code 952 executable by the prioritized/non-prioritized user processing circuit 940 for controlling prioritized/non-prioritized user processing at the base station.

Figure 10:
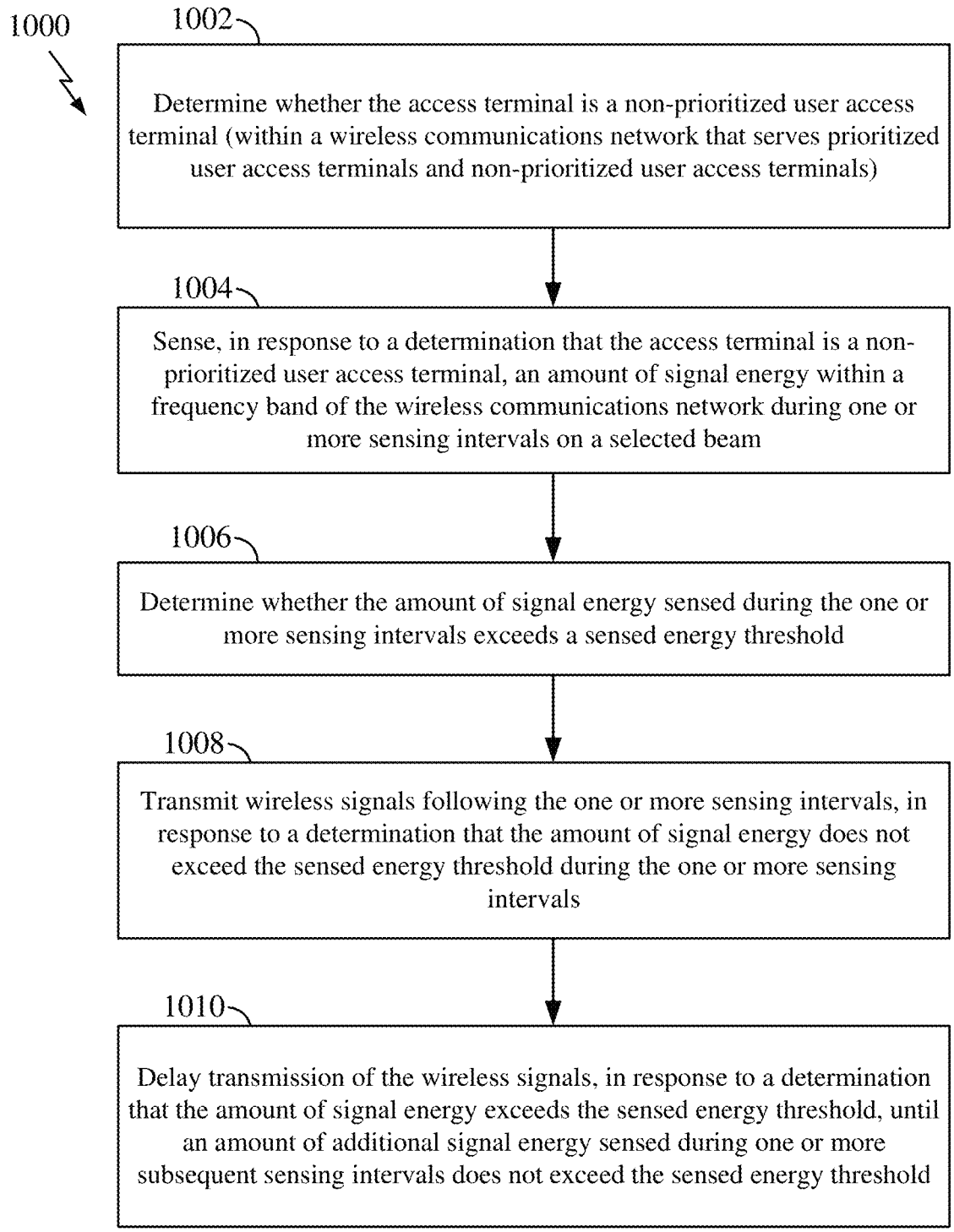
FIG. 10 is a flow chart illustrating an exemplary wireless communication method for use by an access terminal or other wireless communication device in accordance with some aspects.

FIG. 10 is a flow chart illustrating a wireless communication method 1000 according to some aspects of the disclosure. As described below, some or all illustrated features may be omitted in a particular implementation within the scope of the present disclosure, and some illustrated features may not be required for implementation of all examples. The communication method 1000 may be performed, for example, by any of the access terminals, e.g., scheduled entities, illustrated in the figures, such as a UE, or by other suitably-equipped systems, devices or apparatus including a wireless communication device.

At block 1002, the access terminal determines whether the access terminal is a non-prioritized user access terminal (within the wireless communication network that serves prioritized user access terminals and non-prioritized user access terminals). The determination may be made, for example, by receiving indicator signals from a base station or other wireless device and/or by using suitable databases or lookup tables, including defaulting to a non-prioritized user access terminal if no information is found or received indicating the access terminal is prioritized. For example, the prioritized/non-prioritized user clearance processing circuit 840 shown and described above in connection with FIG. 8 may provide a means for determining whether the access terminal is a non-prioritized user access terminal (within the wireless communication network that serves prioritized user access terminals and non-prioritized user access terminals).

At block 1004, in response to a determination that the access terminal is a non-prioritized user access terminal, the access terminal senses an amount of signal energy within a frequency band of the wireless communication network during one or more sensing intervals (such as within a selected sub-band/band segment and on a selected beam (e.g., in a selected direction). For example, the signal energy sensing circuit 842 shown and described above in connection with FIG. 8 may provide a means for sensing an amount of signal energy within a frequency band of the wireless communication network during one or more sensing intervals (in response to a determination that the access terminal is a non-prioritized user access terminal).

At block 1006, the access terminal determines whether the amount of signal energy sensed during the one or more sensing intervals exceeds a signal energy threshold. For example, the antenna gain mismatch determination circuit 844 shown and described above in connection with FIG. 8 may provide a means for determining whether the amount of signal energy sensed during the one or more sensing intervals exceeds a signal energy threshold.

At block 1008, the access terminal transmits wireless signals following the one or more sensing intervals, in response to a determination that the amount of signal energy does not exceed the sensed energy threshold during the one or more sensing intervals. For example, the transceiver 810 shown and described above in connection with FIG. 8 may provide a means for transmitting wireless signals following the one or more sensing intervals (in response to a determination that the amount of signal energy does not exceed the sensed energy threshold during the one or more sensing intervals, wherein the determination is made by the antenna gain mismatch determination circuit 844 under the control of the prioritized/non-prioritized user clearance processing circuit 840). In this manner, transmission is allowed if the sensed signal energy is below the sensed energy threshold within a predetermined or configured time interval or time intervals. It is not necessary to sense prior to each transmission. As explained above, in some aspects once transmissions are permitted, transmissions can continue until a next sensing interval.

At block 1010, transmission of wireless signals by the transceiver 810 is delayed, in response to a determination that the amount of signal energy exceeds the sensed energy threshold, until an amount of additional signal energy sensed during one or more subsequent sensing intervals does not exceed the sensed energy threshold. For example, the prioritized/non-prioritized user clearance processing circuit 840 shown and described above in connection with FIG. 8 may provide a means for delaying transmission of the wireless signals from transceiver 810, in response to a determination (by the antenna gain mismatch determination circuit 844) that the amount of signal energy exceeds the sensed energy threshold, until the amount of signal energy sensed (by the signal energy sensing circuit 84) during one or more subsequent sensing intervals does not exceed the sensed energy threshold (as also determined by the antenna gain mismatch determination circuit 844).

Figure 11:
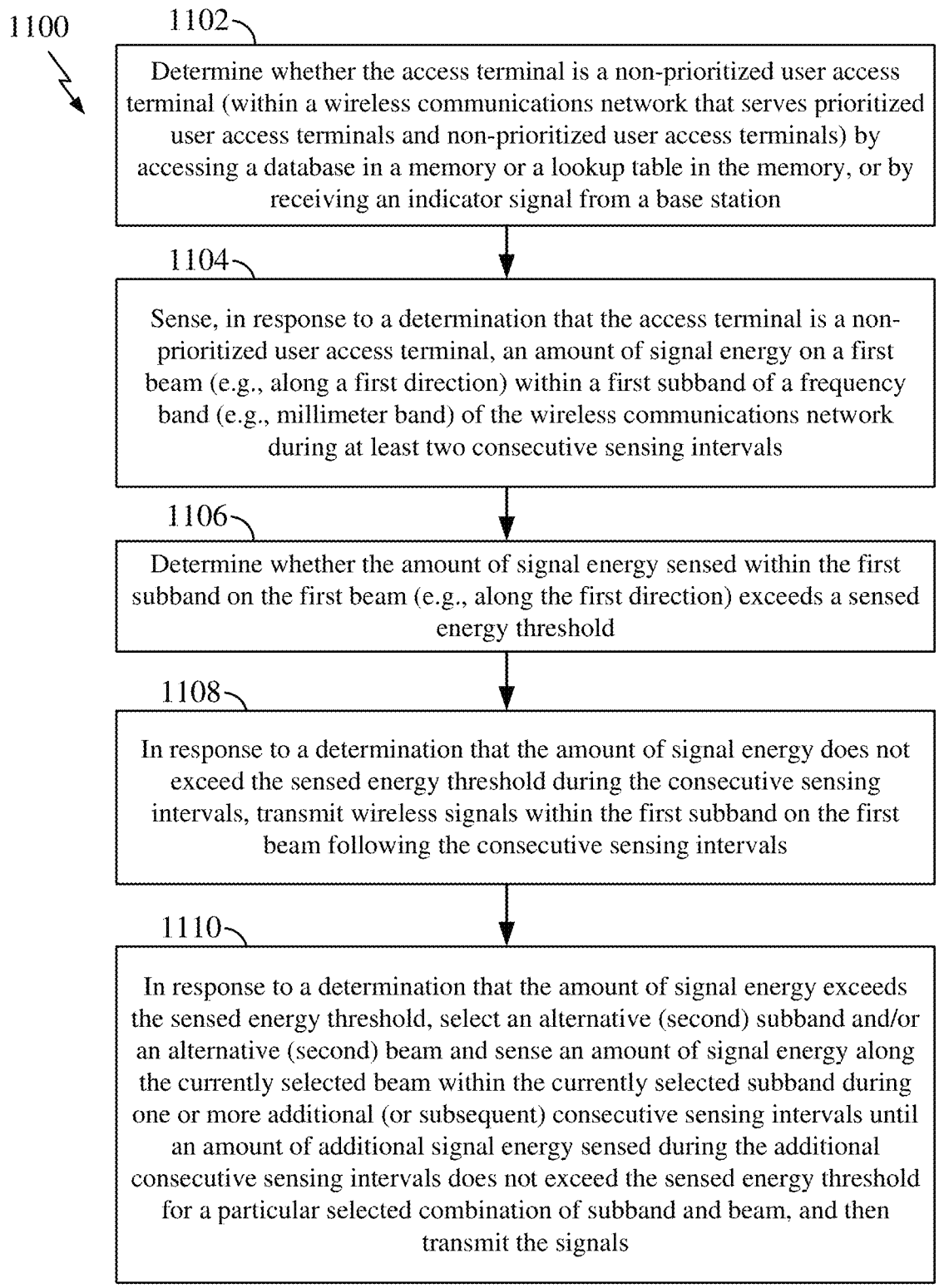
FIG. 11 is a flow chart illustrating further aspects of an exemplary wireless communication method for use by an access terminal or other wireless communication device in accordance with some aspects.

FIG. 11 is a flow chart illustrating a wireless communication method 1100 according to some aspects of the disclosure. As noted, some or all illustrated features may be omitted in a particular implementation within the scope of the present disclosure, and some illustrated features may not be required for implementation of all examples. The communication method 1100 may be performed, for example, by any of the access terminals, e.g., scheduled entities, illustrated in the figures, such as a UE, or by other suitably-equipped systems, devices or apparatus including a wireless communication device.

At block 1102, the access terminal determines whether the access terminal is a non-prioritized user access terminal (within the wireless communication network that serves prioritized user access terminals and non-prioritized user access terminals) by accessing a database or receiving an indicator signal from a base station. For example, the prioritized/non-prioritized user clearance processing circuit 840 shown and described above in connection with FIG. 8 may provide a means for determining whether the access terminal is a non-prioritized user access terminal by accessing a database within memory 805 or by receiving an indicator from a base station via receiver 811.

At block 1104, in response to a determination that the access terminal is a non-prioritized user access terminal, the access terminal senses an amount of signal energy on a first beam (e.g., along a first direction) within a first sub-band of a frequency band (e.g., MM wave band) of the wireless communication network during at least two consecutive sensing intervals. For example, the signal energy sensing circuit 842 shown and described above in connection with FIG. 8 may provide a means for sensing the amount of signal energy on a first beam within a first sub-band of a frequency band of the wireless communication network (as determined by the beamforming antenna array 815) during at least two consecutive sensing intervals (in response to a determination that the access terminal is a non-prioritized user access terminal).

At block 1106, the access terminal determines whether the amount of signal energy sensed within the first sub-band on the first beam (e.g., along the first direction) exceeds a sensed energy threshold. For example, the antenna gain mismatch determination circuit 844 shown and described above in connection with FIG. 8 may provide a means for determining whether the amount of signal energy sensed within the first sub-band on the first beam during the at least two consecutive sensing intervals exceeds a signal energy threshold.

At block 1108, in response to a determination that the amount of signal energy does not exceed the sensed energy threshold during the consecutive sensing intervals, the access terminal transmits wireless signals within the first sub-band on the first beam following the consecutive sensing intervals. For example, the transceiver 810 shown and described above in connection with FIG. 8 may provide a means for transmitting wireless signals within the first sub-band on the first beam following the consecutive sensing intervals (in response to a determination that the amount of signal energy does not exceed the sensed energy threshold during the consecutive sensing intervals).

At block 1110, in response to a determination that the amount of signal energy exceeds the sensed energy threshold, the access terminal selects an alternative (second) sub-band and/or an alternative (second) beam and senses an amount of signal energy on the currently selected beam within the currently selected sub-band during one or more additional (or subsequent) consecutive sensing intervals until an amount of additional signal energy sensed during the additional consecutive sensing intervals does not exceed the sensed energy threshold for a particular selected combination of sub-band and beam, and then transmit the signals. For example, the prioritized/non-prioritized user clearance processing circuit 840 shown and described above in connection with FIG. 8 may provide a means for selecting an alternative (e.g., second) sub-band and/or an alternative (e.g., second) beam for sensing.

Hence, in some aspects, in response to a determination that the amount of signal energy sensed on the first beam exceeds the sensed energy threshold, the method of FIG. 11 includes selecting a second beam and sensing the amount of additional signal energy on the second beam during the one or more subsequent sensing intervals. Moreover, in some aspects, in response to a determination that the amount of signal energy sensed in the first sub-band exceeds the sensed energy threshold, the method of FIG. 11 includes selecting a second sub-band and sensing the amount of additional signal energy in the second sub-band during the one or more subsequent sensing intervals. In some aspects, and as discussed above, the one or more sensing intervals are divided into sensing slots, and determining whether the amount of signal energy exceeds the sensed energy threshold includes determining whether the amount of signal energy exceeds the sensed energy threshold during any of the sensing slots. Also, in some aspects, wherein the one or more subsequent sensing intervals are consecutive sensing intervals, the transmission of wireless signals is delayed or suspended until the amount of signal energy sensed during at least two of the consecutive sensing intervals does not exceed the sensed energy threshold.

Figure 12:
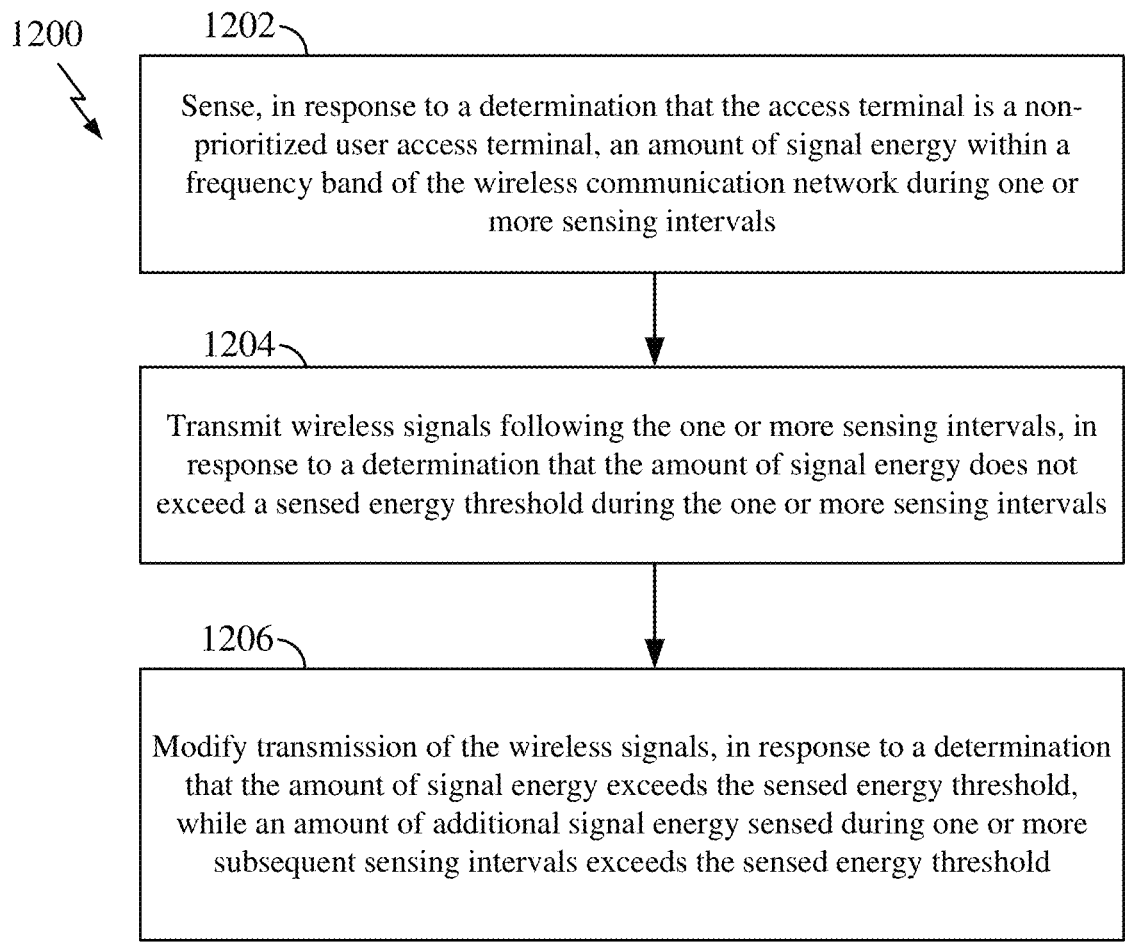
FIG. 12 is a flow chart illustrating another exemplary wireless communication method for use by an access terminal or other wireless communication device in accordance with some aspects.

FIG. 12 is a flow chart illustrating a wireless communication method 1200 according to some aspects of the disclosure. Some or all illustrated features may be omitted in a particular implementation within the scope of the present disclosure, and some illustrated features may not be required for implementation of all examples. The communication method 1200 may be performed, e.g., by any of the access terminals, e.g., scheduled entities, illustrated in the figures, such as a UE, or by other suitably-equipped systems, devices or apparatus including a wireless communication device.

At block 1202, the access terminal senses, in response to a determination that the access terminal is a non-prioritized user access terminal, an amount of signal energy within a frequency band of the wireless communication network during one or more sensing intervals. For example, the signal energy sensing circuit 842 shown and described above in connection with FIG. 8 may provide a means for sensing an amount of signal energy within a frequency band of the wireless communication network during one or more sensing intervals (in response to a determination that the access terminal is a non-prioritized user access terminal).

At block 1204, the access terminal transmits wireless signals following the one or more sensing intervals, in response to a determination that an amount of signal energy does not exceed a sensed energy threshold during the one or more sensing intervals. For example, the transceiver 810 shown and described above in connection with FIG. 8 may provide a means for transmitting wireless signals following the one or more sensing intervals (in response to a determination that the amount of signal energy does not exceed a sensed energy threshold during the one or more sensing intervals, wherein the determination is made by the antenna gain mismatch determination circuit 844 under the control of the prioritized/non-prioritized user clearance processing circuit 840). In this manner, transmission is allowed if the sensed signal energy is below the sensed energy threshold within a predetermined or configured time interval or time intervals. It is not necessary to sense prior to each transmission. As explained above, in some aspects once transmissions are permitted, transmissions can continue until a next sensing interval.

At block 1206, transmission of wireless signals by the transceiver 810 is modified by the access terminal, in response to a determination that the amount of signal energy exceeds the sensed energy threshold, while an amount of additional signal energy sensed during one or more subsequent sensing intervals exceeds the sensed energy threshold. For example, the prioritized/non-prioritized user clearance processing circuit 840 shown and described above in connection with FIG. 8 may provide a means for modifying transmission of the wireless signals from transceiver 810, in response to a determination (by the antenna gain mismatch determination circuit 844) that the amount of signal energy exceeds the sensed energy threshold, while the amount of signal energy sensed (by the signal energy sensing circuit 84) during one or more subsequent sensing intervals exceeds the sensed energy threshold (as also determined by the antenna gain mismatch determination circuit 844).

As explained above, in some examples, an access terminal may modify a transmission by delaying the transmission until the amount of sensed signal energy no longer exceeds the sensed energy threshold. In other examples, the access terminal modifies the transmission by adjusting the transmission to reduce transmission power until the amount of signal energy no longer exceeds the sensed energy threshold by, for example, switching to a different sub-band or a different beam, reducing antenna gain, or by adjusting transmission parameters to lower a PSD for the transmissions.

Figure 13:
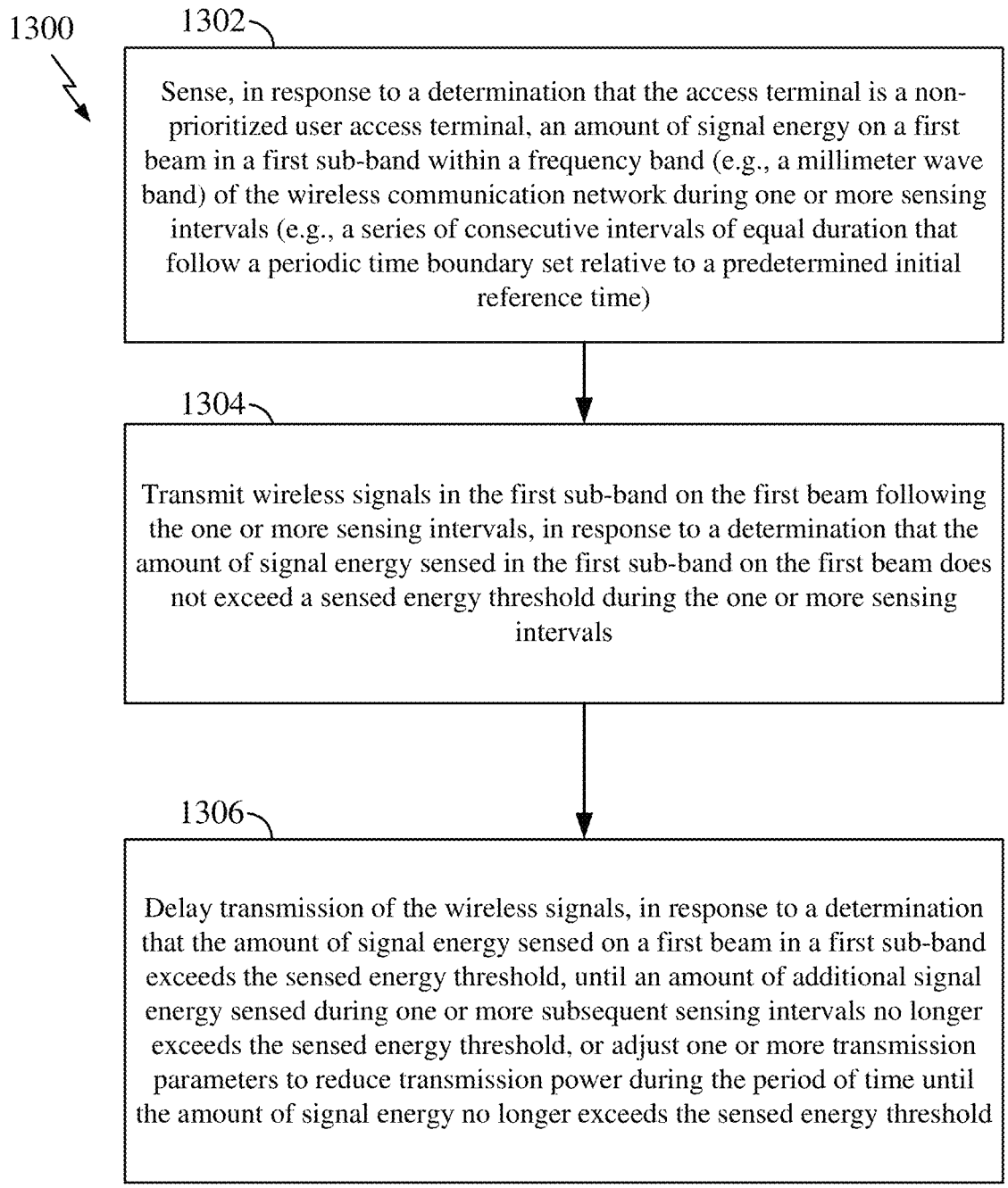
FIG. 13 is a flow chart illustrating further aspects of an exemplary wireless communication method for use by an access terminal or other wireless communication device in accordance with some aspects.

FIG. 13 is a flow chart illustrating a wireless communication method 1300 according to some aspects of the disclosure. Some or all illustrated features may be omitted in a particular implementation within the scope of the present disclosure, and some illustrated features may not be required for implementation of all examples. The communication method 1300 may be performed, e.g., by any of the access terminals, e.g., scheduled entities, illustrated in the figures, such as a UE, or by other suitably-equipped systems, devices or apparatus including a wireless communication device.

At block 1302, the access terminal senses, in response to a determination that the access terminal is a non-prioritized user access terminal, an amount of signal energy on a first beam in a first sub-band within a frequency band (such as a MM wave band) of the wireless communication network during one or more sensing intervals (such as a series of consecutive intervals of equal duration that follow a periodic time boundary set relative to a predetermined initial reference time).

At block 1304, the access terminal transmits wireless signals in the first sub-band on the first beam following the one or more sensing intervals, in response to a determination that the amount of signal energy sensed in the first sub-band on the first beam does not exceed a sensed energy threshold during the one or more sensing intervals.

At block 1306, transmission of wireless signals by the transceiver 810 is delayed by the access terminal, in response to a determination that the amount of signal energy sensed on a first beam in a first sub-band exceeds the sensed energy threshold, until an amount of additional signal energy sensed during one or more subsequent sensing intervals no longer exceeds the sensed energy threshold. Alternatively, at 1306, the access terminal adjusts one or more transmission parameters to reduce transmission power during the period of time until the amount of signal energy no longer exceeds the sensed energy threshold. As explained above, adjustments may include switching to a different sub-band or a different beam, reducing antenna gain, or by adjusting transmission parameters to lower a PSD for the transmissions.

FIG. 14 illustrates exemplary beams for use in communication between a RAN node 1404 and a wireless communication device 1402, wherein the communication uses downlink beamformed signals according to some aspects. The RAN node 1404 may be any of the base stations or scheduling entities illustrated in FIG. 1, 2, 5, or 9 and the wireless communication device 1402 may be any of the access terminals, UEs or scheduled entities illustrated in FIG. 1, 2, 5 or 8. It should be noted that while some beams are illustrated as adjacent to one another, such an arrangement may be different in different aspects. In some examples, beams transmitted during a same symbol may not be adjacent to one another. In some examples, the RAN node 1404 may transmit more or less beams distributed in all directions (e.g., 360 degrees).

In the example shown in FIG. 14, a beam set contains eight different beams 1421, 1422, 1423, 1424, 1425, 1426, 1427, 1428, each associated with a different beam direction. In some examples, the RAN node 1404 may be configured to sweep or transmit each of the beams 1421, 1422, 1423, 1424, 1425, 1426, 1427, 1428 during a synchronization slot. For example, the RAN node 1404 may transmit a reference signal, such as a SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)).

The wireless communication device 1402 searches for and identifies the beams based on the beam reference signals. The wireless communication device 1402 then performs beam measurements (e.g., RSRP, SINR, RSRQ, etc.) on the beam reference signals to determine the respective beam quality of each of the beams. In examples in which the wireless communication device 1402 is in a RRC connected state, the wireless communication device 1402 may generate and transmit an L1 measurement report, including the respective beam identifier (beam index) and beam measurement of one or more of the beams 1421-1428 to the RAN node 1404. The RAN node 1404 may then determine the downlink beam (e.g., beam 1424) on which to transmit unicast downlink control information and/or user data traffic to the wireless communication device 1402. In some examples, the selected downlink beam has the highest gain from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

In other examples, when the channel is reciprocal (e.g., the downlink and uplink channel qualities are the same), the RAN node 1404 may derive a downlink beam. Derivation of the downlink beam can be based on uplink measurements performed by the RAN node 1404, such as by measuring the received power, quality, or other variable of a sounding reference signal (SRS) or other uplink reference signal transmitted by the wireless communication device 1402. In some examples, the RAN node 1404 may derive the downlink beam based on a combination of the L1 measurement report and uplink measurements.

In examples in which the wireless communication device 1402 is a RRC idle state, the wireless communication device 1402 may use the beam measurements to select a downlink beam on which to receive broadcast communications from the RAN node 1404. The broadcast communications may include, for example, paging messages transmitted from the RAN node 1404 to the wireless communication device 1402 when new data arrives for the wireless communication device 1402 at the network. In some examples, a paging message may be broadcast by the RAN node 1404 over multiple downlink beams. The paging message may then be received by the wireless communication device 1402 on the selected downlink beam.

In one configuration, an apparatus for wireless communication includes means for performing the methods, functions, or processes as described above, including means for controlling non-prioritized user access as described above. In one aspect, the aforementioned means may be the processor(s) of FIGS. 8 and 9 configured to perform the functions recited by the aforementioned means. In another aspect, the aforementioned means may be a circuit or any apparatus configured to perform the functions recited by the aforementioned means.

Of course, in the above examples, the circuitry included in the processors of FIGS. 8 and 9 is merely provided as an example, and other means for carrying out the described functions may be included within various aspects of the present disclosure, including but not limited to the instructions stored in the computer-readable storage media 8 and 9, or any other suitable apparatus or means described in any one of the figures and utilizing, for example, the processes and/or algorithms described herein in relation to the figures.

The following provides an overview of examples of the present disclosure.

Example 1: an access terminal for use within a wireless communication network that serves prioritized user access terminals and non-prioritized user access terminals, comprising: a transceiver; a memory; and a processor communicatively coupled to the transceiver and the memory and configured to: sense, in response to a determination that the access terminal is a non-prioritized user access terminal, an amount of signal energy within a frequency band of the wireless communication network during one or more sensing intervals using the transceiver; transmit wireless signals using the transceiver following the one or more sensing intervals, in response to a determination that the amount of signal energy does not exceed a sensed energy threshold during the one or more sensing intervals; and modify transmission of the wireless signals by the transceiver, in response to a determination that the amount of signal energy exceeds the sensed energy threshold, while an amount of additional signal energy sensed during one or more subsequent sensing intervals exceeds the sensed energy threshold.

Example 2: the access terminal of example 1, wherein the processor is configured to sense the amount of signal energy by sensing signal energy on a first beam using the transceiver.

Example 3: the access terminal of example 2, wherein the processor is further configured to control the transceiver to transmit the wireless signals on the first beam in response to a determination that the amount of signal energy sensed on the first beam does not exceed the sensed energy threshold.

Example 4: the access terminal of examples 2 or 3, wherein the processor is further configured to select, in response to a determination that the amount of signal energy sensed on the first beam exceeds the sensed energy threshold, a second beam and sense the amount of additional signal energy on the second beam during the one or more subsequent sensing intervals using the transceiver.

Example 5: the access terminal of examples 1, 2, 3, or 4, wherein the processor is configured to sense the amount of signal energy by sensing energy in a first sub-band of the frequency band using the transceiver.

Example 6: the access terminal of example 5, wherein the processor is further configured to control the transceiver, in response to a determination that the amount of signal energy sensed in the first sub-band does not exceed the sensed energy threshold, to transmit the wireless signals in the first sub-band.

Example 7: the access terminal of examples 5 or 6, wherein the processor is further configured to control the transceiver, in response to a determination that the amount of signal energy sensed in the first sub-band exceeds the sensed energy threshold, to select a second sub-band of the frequency band and sense the amount of additional signal energy in the second sub-band during the one or more subsequent sensing intervals.

Example 8: the access terminal of examples 1, 2, 3, 4, 5, 6, or 7, wherein the frequency band is configured as an MM wave band.

Example 9: the access terminal of examples 1, 2, 3, 4, 5, 6, 7, or 8, wherein the processor is further configured to determine an amount of gain mismatch between a receiver antenna gain of the transceiver and a transmitter antenna gain of the transceiver.

Example 10: the access terminal of examples 9, wherein the processor is further configured to control the transceiver to transmit the wireless signals following the one or more sensing intervals in response to both a determination that (a) the amount of signal energy does not exceed the sensed energy threshold and (b) the amount of gain mismatch does not exceed a separate gain mismatch threshold.

Example 11: the access terminal of examples 1, 2, 3, 4, 5, 6, 7, 8, 9, or 10, wherein the one or more sensing intervals comprise a series of consecutive intervals of equal duration that follow a periodic time boundary set relative to a predetermined initial reference time.

Example 12: the access terminal of examples 1, 2, 3, 4, 5, 6, 7, 8, 9, 10, or 11, wherein the one or more sensing intervals are divided into sensing slots, and wherein the processor is configured to determine whether the amount of signal energy exceeds the sensed energy threshold by determining whether the amount of signal energy exceeds the sensed energy threshold during any of the sensing slots.

Example 13: the access terminal of examples 1, 2, 3, 4, 5, 6, 7, 8, 9, 10, 11, or 12, wherein the processor is further configured to modify the transmission of the wireless signals, in response to the determination that the amount of signal energy exceeds the sensed energy threshold, by delaying the transmission of the wireless signals until the amount of signal energy no longer exceeds the sensed energy threshold.

Example 14: the access terminal of examples 1, 2, 3, 4, 5, 6, 7, 8, 9, 10, 11, or 12, wherein the processor is further configured to modify the transmission of the wireless signals, in response to the determination that the amount of signal energy exceeds the sensed energy threshold, by adjusting one or more transmission parameters to reduce transmission power until the amount of signal energy no longer exceeds the sensed energy threshold.

Example 15: a method for wireless communication by an access terminal in a wireless communication network that serves prioritized user access terminals and non-prioritized user access terminals, the method comprising: sensing, in response to a determination that the access terminal is a non-prioritized user access terminal, an amount of signal energy within a frequency band of the wireless communication network during one or more sensing intervals; transmitting wireless signals following the one or more sensing intervals, in response to a determination that the amount of signal energy does not exceed a sensed energy threshold during the one or more sensing intervals; and modifying transmission of the wireless signals, in response to a determination that the amount of signal energy exceeds the sensed energy threshold, while an amount of additional signal energy sensed during one or more subsequent sensing intervals exceeds the sensed energy threshold.

Example 16: the method of example 15, wherein sensing the amount of signal energy comprises sensing signal energy on a first beam.

Example 17: the method of example 16, wherein, in response to a determination that the amount of signal energy sensed on the first beam does not exceed the sensed energy threshold, transmitting the wireless signals on the first beam.

Example 18: the method of examples 16 or 17, wherein, in response to a determination that the amount of signal energy sensed on the first beam exceeds the sensed energy threshold, selecting a second beam and sensing the amount of additional signal energy on the second beam during the one or more subsequent sensing intervals.

Example 19: the method of examples 15, 16, 17, or 18, wherein sensing the amount of signal energy comprises sensing energy in a first sub-band of the frequency band.

Example 20: the method of example 19, wherein, in response to a determination that the amount of signal energy sensed in the first sub-band does not exceed the sensed energy threshold, transmitting the wireless signals in the first sub-band.

Example 21: the method of examples 19 or 20, wherein, in response to a determination that the amount of signal energy sensed in the first sub-band exceeds the sensed energy threshold, selecting a second sub-band and sensing the amount of additional signal energy in the second sub-band during the one or more subsequent sensing intervals.

Example 22: the method of examples 15, 16, 17, 18, 19, 20, or 21, wherein the frequency band is an MM wave band.

Example 23: the method of examples 15, 16, 17, 18, 19, 20, or 22, further comprising determining an amount of gain mismatch between a receiver antenna gain of the access terminal and a transmitter antenna gain of the access terminal during the one or more sensing intervals.

Example 24: the method of example 23, wherein the wireless signals are transmitted following the one or more sensing intervals in response to determination that (a) the amount of signal energy does not exceed the sensed energy threshold and (b) the amount of gain mismatch does not exceed a separate gain mismatch threshold.

Example 25: the method of examples 15, 16, 17, 18, 19, 20, 21, 22, 23, or 24, wherein the one or more sensing intervals comprise a series of consecutive intervals of equal duration that follow a periodic time boundary set relative to a predetermined initial reference time.

Example 26: the method of examples 15, 16, 17, 18, 19, 20, 21, 22, 23, 24, or 25, wherein the one or more sensing intervals are divided into sensing slots, and wherein determining whether the amount of signal energy exceeds the sensed energy threshold comprises determining whether the amount of signal energy exceeds the sensed energy threshold during any of the sensing slots.

Example 27: the method of examples 15, 16, 17, 18, 19, 20, 21, 22, 23, 24, 25, or 26, wherein modifying the transmission of the wireless signals, in response to the determination that the amount of signal energy exceeds the sensed energy threshold, comprises delaying the transmission of the wireless signals until the amount of signal energy no longer exceeds the sensed energy threshold.

Example 28: the method of examples 15, 16, 17, 18, 19, 20, 21, 22, 23, 24, 25, or 26, wherein modifying the transmission of the wireless signals, in response to the determination that the amount of signal energy exceeds the sensed energy threshold, comprises adjusting one or more transmission parameters to reduce transmission power until the amount of signal energy no longer exceeds the sensed energy threshold.

Example 29: an apparatus for use in an access terminal of a wireless communication network that serves prioritized user access terminals and non-prioritized user access terminals, the apparatus comprising: means, operative in response to a determination that the access terminal is a non-prioritized user access terminal, for sensing an amount of signal energy within a frequency band of the wireless communication network during one or more sensing intervals; means for transmitting wireless signals following the one or more sensing intervals, in response to a determination that the amount of signal energy does not exceed a sensed energy threshold during the one or more sensing intervals; and means for modifying transmission of the wireless signals, in response to a determination that the amount of signal energy exceeds the sensed energy threshold, while an amount of additional signal energy sensed during one or more subsequent sensing intervals exceeds the sensed energy threshold.

Example 30: a non-transitory computer-readable medium having one or more instructions which, when executed by a processing circuit of an access terminal in a wireless communication network that serves prioritized user access terminals and non-prioritized user access terminals, causes the processing circuit to: sense, in response to a determination that the access terminal is a non-prioritized user access terminal, an amount of signal energy within a frequency band of the wireless communication network during one or more sensing intervals; transmit wireless signals following the one or more sensing intervals, in response to a determination that the amount of signal energy does not exceed a sensed energy threshold during the one or more sensing intervals; and modify transmission of the wireless signals, in response to a determination that the amount of signal energy exceeds the sensed energy threshold, while an amount of additional signal energy sensed during one or more subsequent sensing intervals exceeds the sensed energy threshold.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

While aspects and embodiments are described in this application by illustration to some examples, those skilled in the art will understand that additional implementations and use cases may come about in many different arrangements and scenarios. Features described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range across a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that features described herein may be practiced in a wide variety of devices, chip-level components, systems, distributed arrangements, end-user devices, etc. of varying sizes, shapes and constitution.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 8, 9, and 14 may be configured to perform one or more of the methods, features, or steps described herein. The novel algorithms described herein may also be efficiently implemented in software and/or embedded in hardware. Generally speaking, the various components, steps, features and/or functions illustrated in FIGS. 1-14 are not mutually exclusive.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An access terminal for use within a wireless communication network that serves prioritized user access terminals and non-prioritized user access terminals, comprising:
   a transceiver;
   a memory; and
   a processor communicatively coupled to the transceiver and the memory and configured to:
      sense, in response to a determination that the access terminal is a non-prioritized user access terminal, an amount of signal energy within a frequency band of the wireless communication network during one or more sensing intervals using the transceiver;
      transmit wireless signals using the transceiver following the one or more sensing intervals, in response to a determination that the amount of signal energy does not exceed a sensed energy threshold during the one or more sensing intervals; and
      modify transmission of the wireless signals by the transceiver, in response to a determination that the amount of signal energy exceeds the sensed energy threshold, while an amount of additional signal energy sensed during one or more subsequent sensing intervals exceeds the sensed energy threshold.

2. The access terminal of claim 1, wherein the processor is configured to sense the amount of signal energy by sensing signal energy on a first beam using the transceiver.

3. The access terminal of claim 2, wherein the processor is further configured to control the transceiver to transmit the wireless signals on the first beam in response to a determination that the amount of signal energy sensed on the first beam does not exceed the sensed energy threshold.

4. The access terminal of claim 3, wherein the processor is further configured to select, in response to a determination that the amount of signal energy sensed on the first beam exceeds the sensed energy threshold, a second beam and sense the amount of additional signal energy on the second beam during the one or more subsequent sensing intervals using the transceiver.

5. The access terminal of claim 1, wherein the processor is configured to sense the amount of signal energy by sensing energy in a first sub-band of the frequency band using the transceiver.

6. The access terminal of claim 5, wherein the processor is further configured to control the transceiver, in response to a determination that the amount of signal energy sensed in the first sub-band does not exceed the sensed energy threshold, to transmit the wireless signals in the first sub-band.

7. The access terminal of claim 5, wherein the processor is further configured to control the transceiver, in response to a determination that the amount of signal energy sensed in the first sub-band exceeds the sensed energy threshold, to select a second sub-band of the frequency band and sense the amount of additional signal energy in the second sub-band during the one or more subsequent sensing intervals.

8. The access terminal of claim 1, wherein the frequency band is configured as a millimeter (MM) wave band.

9. The access terminal of claim 1, wherein the processor is further configured to determine an amount of gain mismatch between a receiver antenna gain of the transceiver and a transmitter antenna gain of the transceiver.

10. The access terminal of claim 9, wherein the processor is further configured to control the transceiver to transmit the wireless signals following the one or more sensing intervals in response to both a determination that (a) the amount of signal energy does not exceed the sensed energy threshold and (b) the amount of gain mismatch does not exceed a separate gain mismatch threshold.

11. The access terminal of claim 1, wherein the one or more sensing intervals comprise a series of consecutive intervals of equal duration that follow a periodic time boundary set relative to a predetermined initial reference time.

12. The access terminal of claim 1, wherein the one or more sensing intervals are divided into sensing slots, and wherein the processor is configured to determine whether the amount of signal energy exceeds the sensed energy threshold by determining whether the amount of signal energy exceeds the sensed energy threshold during any of the sensing slots.

13. The access terminal of claim 1, wherein the processor is further configured to modify the transmission of the wireless signals, in response to the determination that the amount of signal energy exceeds the sensed energy threshold, by delaying the transmission of the wireless signals until the amount of signal energy no longer exceeds the sensed energy threshold.

14. The access terminal of claim 1, wherein the processor is further configured to modify the transmission of the wireless signals, in response to the determination that the amount of signal energy exceeds the sensed energy threshold, by adjusting one or more transmission parameters to reduce transmission power until the amount of signal energy no longer exceeds the sensed energy threshold.

15. A method for wireless communication by an access terminal in a wireless communication network that serves prioritized user access terminals and non-prioritized user access terminals, the method comprising:
sensing, in response to a determination that the access terminal is a non-prioritized user access terminal, an amount of signal energy within a frequency band of the wireless communication network during one or more sensing intervals;
transmitting wireless signals following the one or more sensing intervals, in response to a determination that the amount of signal energy does not exceed a sensed energy threshold during the one or more sensing intervals; and
modifying transmission of the wireless signals, in response to a determination that the amount of signal energy exceeds the sensed energy threshold, while an amount of additional signal energy sensed during one or more subsequent sensing intervals exceeds the sensed energy threshold.

16. The method of claim 15, wherein sensing the amount of signal energy comprises sensing signal energy on a first beam.

17. The method of claim 16, wherein, in response to a determination that the amount of signal energy sensed on the first beam does not exceed the sensed energy threshold, transmitting the wireless signals on the first beam.

18. The method of claim 17, wherein, in response to a determination that the amount of signal energy sensed on the first beam exceeds the sensed energy threshold, selecting a second beam and sensing the amount of additional signal energy on the second beam during the one or more subsequent sensing intervals.

19. The method of claim 15, wherein sensing the amount of signal energy comprises sensing energy in a first sub-band of the frequency band.

20. The method of claim 19, wherein, in response to a determination that the amount of signal energy sensed in the first sub-band does not exceed the sensed energy threshold, transmitting the wireless signals in the first sub-band.

21. The method of claim 19, wherein, in response to a determination that the amount of signal energy sensed in the first sub-band exceeds the sensed energy threshold, selecting a second sub-band and sensing the amount of additional signal energy in the second sub-band during the one or more subsequent sensing intervals.

22. The method of claim 15, wherein the frequency band is a millimeter (MM) wave band.

23. The method of claim 15, further comprising determining an amount of gain mismatch between a receiver antenna gain of the access terminal and a transmitter antenna gain of the access terminal during the one or more sensing intervals.

24. The method of claim 23, wherein the wireless signals are transmitted following the one or more sensing intervals in response to determination that (a) the amount of signal energy does not exceed the sensed energy threshold and (b) the amount of gain mismatch does not exceed a separate gain mismatch threshold.

25. The method of claim 15, wherein the one or more sensing intervals comprise a series of consecutive intervals of equal duration that follow a periodic time boundary set relative to a predetermined initial reference time.

26. The method of claim 15, wherein the one or more sensing intervals are divided into sensing slots, and wherein determining whether the amount of signal energy exceeds the sensed energy threshold comprises determining whether the amount of signal energy exceeds the sensed energy threshold during any of the sensing slots.

27. The method of claim 15, wherein modifying the transmission of the wireless signals, in response to the determination that the amount of signal energy exceeds the sensed energy threshold, comprises delaying the transmission of the wireless signals until the amount of signal energy no longer exceeds the sensed energy threshold.

28. The method of claim 15, wherein modifying the transmission of the wireless signals, in response to the determination that the amount of signal energy exceeds the sensed energy threshold, comprises adjusting one or more transmission parameters to reduce transmission power until the amount of signal energy no longer exceeds the sensed energy threshold.

29. An apparatus for use in an access terminal of a wireless communication network that serves prioritized user access terminals and non-prioritized user access terminals, the apparatus comprising:
means, operative in response to a determination that the access terminal is a non-prioritized user access terminal, for sensing an amount of signal energy within a frequency band of the wireless communication network during one or more sensing intervals;

means for transmitting wireless signals following the one or more sensing intervals, in response to a determination that the amount of signal energy does not exceed a sensed energy threshold during the one or more sensing intervals; and means for modifying transmission of the wireless signals, in response to a determination that the amount of signal energy exceeds the sensed energy threshold, while an amount of additional signal energy sensed during one or more subsequent sensing intervals exceeds the sensed energy threshold.

30. A non-transitory computer-readable medium having one or more instructions which, when executed by a processing circuit of an access terminal in a wireless communication network that serves prioritized user access terminals and non-prioritized user access terminals, causes the processing circuit to:

sense, in response to a determination that the access terminal is a non-prioritized user access terminal, an amount of signal energy within a frequency band of the wireless communication network during one or more sensing intervals;

transmit wireless signals following the one or more sensing intervals, in response to a determination that the amount of signal energy does not exceed a sensed energy threshold during the one or more sensing intervals; and modify transmission of the wireless signals, in response to a determination that the amount of signal energy exceeds the sensed energy threshold, while an amount of additional signal energy sensed during one or more subsequent sensing intervals exceeds the sensed energy threshold.

* * * * *